United States Patent
Pearl et al.

(10) Patent No.: US 10,708,321 B2
(45) Date of Patent: Jul. 7, 2020

(54) CONFIGURABLE METADATA-BASED AUTOMATION AND CONTENT CLASSIFICATION ARCHITECTURE FOR CLOUD-BASED COLLABORATION PLATFORMS

(71) Applicant: Box, Inc., Redwood City, CA (US)

(72) Inventors: Annie Pearl, San Francisco, CA (US); James Huamonte, Redwood City, CA (US); Brian Tran, Redwood City, CA (US); Tiffany Low, Redwood City, CA (US); Pierre-Alexandre Masse, Redwood City, CA (US); Ted Blosser, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 295 days.

(21) Appl. No.: 15/679,532

(22) Filed: Aug. 17, 2017

(65) Prior Publication Data

US 2017/0346861 A1   Nov. 30, 2017

Related U.S. Application Data

(63) Continuation of application No. 14/474,008, filed on Aug. 29, 2014, now Pat. No. 9,894,119.

(51) Int. Cl.
*G06F 15/16* (2006.01)
*H04L 29/06* (2006.01)
(Continued)

(52) U.S. Cl.
CPC ............ *H04L 65/403* (2013.01); *G06F 16/11* (2019.01); *G06F 16/14* (2019.01); *H04L 67/10* (2013.01); *H04W 4/60* (2018.02)

(58) Field of Classification Search
CPC ........ G06F 16/11; G06F 16/14; H04L 65/403; H04L 67/10; H04W 4/60
See application file for complete search history.

(56) References Cited

U.S. PATENT DOCUMENTS

| | | |
|---|---|---|
| 858,619 A | 7/1907 | O'Farrell |
| 5,748,735 A | 5/1998 | Ganesan |

(Continued)

FOREIGN PATENT DOCUMENTS

| | | |
|---|---|---|
| CA | 2724521 A1 | 11/2009 |
| CN | 101997924 A | 3/2011 |

(Continued)

OTHER PUBLICATIONS

"Agilewords—Features, Powerful Features Yet Simple," Jun. 1, 2011, http://web.archive.org/web/20110601223756/http://agilewords.com/product/features, 3 pages.

(Continued)

*Primary Examiner* — Normin Abedin
(74) *Attorney, Agent, or Firm* — Sheridan Ross P.C.

(57) ABSTRACT

Scalable architectures, systems, and services are provided herein for generating jobs by applying user-specified metadata rules to metadata events. More specifically, the scalable architecture described herein uses metadata to drive automations and/or polices in a cloud-based environment. In one embodiment, the architecture integrates a metadata service with an event-based automation engine to automatically trigger polices and/or automations based on metadata and/or changes in metadata changes. The metadata service can include customizable and/or pre-build metadata templates which can be used to automatically apply a metadata framework (e.g., particular fields) to files based on, for example, the upload or placement of a particular file in a particular (Continued)

folder. The architecture also provides for advanced metadata searching and data classification.

25 Claims, 16 Drawing Sheets

(51) Int. Cl.
*H04L 29/08* (2006.01)
*H04W 4/60* (2018.01)
*G06F 16/11* (2019.01)
*G06F 16/14* (2019.01)

(56) References Cited

U.S. PATENT DOCUMENTS

| | | |
|---|---|---|
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,978,480 A | 11/1999 | Fong et al. |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,057,841 A | 5/2000 | Thurlow et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,226,630 B1 | 5/2001 | Billmers |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,178,021 B1 | 2/2007 | Hanna et al. |
| 7,222,078 B2 | 5/2007 | Abelow |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,353 B2 | 6/2011 | Matsuzaki et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,214,747 B1 | 7/2012 | Yankovich et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |
| 8,650,498 B1 | 2/2014 | Mihovilovic |
| 8,719,445 B2 | 5/2014 | Ko |
| 8,745,267 B2 | 6/2014 | Luecke et al. |
| 8,825,597 B1 | 9/2014 | Houston et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |
| 8,930,475 B1 | 1/2015 | North et al. |
| 8,949,939 B2 | 2/2015 | Peddada |
| 8,959,579 B2 | 2/2015 | Barton et al. |
| 8,966,062 B1 | 2/2015 | Giese et al. |
| 8,990,955 B2 | 3/2015 | Hymel et al. |
| 9,535,909 B2 | 1/2017 | Masse et al. |
| 9,894,119 B2 | 2/2018 | Pearl et al. |
| 9,904,435 B2 | 2/2018 | Savage |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0188753 A1 | 12/2002 | Tang et al. |
| 2002/0194177 A1 | 12/2002 | Sherman et al. |
| 2003/0041095 A1 | 2/2003 | Konda et al. |

(56) References Cited

U.S. PATENT DOCUMENTS

| | | |
|---|---|---|
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0021686 A1 | 2/2004 | Barberis |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0038997 A1 | 2/2005 | Kojima et al. |
| 2005/0044250 A1 | 2/2005 | Gay et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0101328 A1 | 5/2006 | Albornoz et al. |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265489 A1 | 11/2006 | Moore |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0016680 A1 | 1/2007 | Burd et al. |
| 2007/0038934 A1 | 2/2007 | Fellman |
| 2007/0061266 A1 | 3/2007 | Moore et al. |
| 2007/0061393 A1 | 3/2007 | Moore |
| 2007/0061487 A1 | 3/2007 | Moore et al. |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0106536 A1 | 5/2007 | Moore |
| 2007/0106537 A1 | 5/2007 | Moore |
| 2007/0106750 A1 | 5/2007 | Moore |
| 2007/0106751 A1 | 5/2007 | Moore |
| 2007/0106752 A1 | 5/2007 | Moore |
| 2007/0106753 A1 | 5/2007 | Moore |
| 2007/0106754 A1 | 5/2007 | Moore |
| 2007/0115845 A1 | 5/2007 | Hochwarth et al. |
| 2007/0116036 A1 | 5/2007 | Moore |
| 2007/0116037 A1 | 5/2007 | Moore |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0156630 A1 | 7/2007 | Steinmaier et al. |
| 2007/0162610 A1 | 7/2007 | Un et al. |
| 2007/0168461 A1 | 7/2007 | Moore |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040151 A1 | 2/2008 | Moore |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243807 A1 | 10/2008 | Gaucas et al. |
| 2008/0243855 A1 | 10/2008 | Prahlad et al. |
| 2008/0250028 A1 | 10/2008 | Rutherglen et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |

(56) References Cited

U.S. PATENT DOCUMENTS

| | | |
|---|---|---|
| 2009/0030710 A1 | 1/2009 | Levine |
| 2009/0037520 A1 | 2/2009 | Loffredo |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0172773 A1 | 7/2009 | Moore |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0234850 A1* | 9/2009 | Kocsis .................. G06F 16/213 |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0259694 A1 | 10/2009 | Hama |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | Fitzgerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022642 A1 | 1/2011 | deMilo et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0142410 A1 | 6/2011 | Ishii |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |

(56) References Cited

U.S. PATENT DOCUMENTS

| | | |
|---|---|---|
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0096521 A1 | 4/2012 | Peddada |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0222106 A1 | 8/2012 | Kuehl |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007587 A1* | 1/2013 | Marantz ............ G06F 16/9535 715/234 |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0103677 A1 | 4/2013 | Chakra et al. |
| 2013/0104251 A1 | 4/2013 | Moore et al. |
| 2013/0110565 A1 | 5/2013 | Means, Jr. et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0179799 A1 | 7/2013 | Savage |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0262210 A1 | 10/2013 | Savage et al. |
| 2013/0262556 A1* | 10/2013 | Xu ..................... G06F 9/5027 709/202 |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282776 A1* | 10/2013 | Durrant ............ G06F 9/45533 707/827 |
| 2013/0282830 A1 | 10/2013 | Besen et al. |
| 2013/0291060 A1 | 10/2013 | Moore |
| 2013/0305039 A1 | 11/2013 | Gauda |
| 2013/0326344 A1 | 12/2013 | Masselle et al. |
| 2013/0346444 A1* | 12/2013 | Makkar ............ G06F 16/907 707/770 |
| 2014/0007205 A1 | 1/2014 | Oikonomou |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0059217 A1 | 2/2014 | Pizurica |
| 2014/0068589 A1 | 3/2014 | Barak |
| 2014/0074629 A1 | 3/2014 | Rathod |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0181968 A1 | 6/2014 | Ge et al. |
| 2014/0208414 A1* | 7/2014 | Brandwine ......... G06F 21/6218 726/17 |
| 2014/0213371 A1 | 7/2014 | Jain |
| 2014/0281870 A1 | 9/2014 | Vogel et al. |
| 2014/0344456 A1 | 11/2014 | Buzbee et al. |
| 2014/0359286 A1 | 12/2014 | Wen et al. |
| 2015/0019723 A1 | 1/2015 | Kweon et al. |
| 2015/0056596 A1 | 2/2015 | Bercovitz et al. |
| 2015/0081624 A1 | 3/2015 | Masse et al. |
| 2015/0082197 A1 | 3/2015 | Pearl et al. |
| 2016/0004820 A1 | 1/2016 | Moore |
| 2016/0065627 A1 | 3/2016 | Pearl et al. |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |

(56) References Cited

FOREIGN PATENT DOCUMENTS

| | | |
|---|---|---|
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

"Agilewords—How to Request Approval," YouTube, http://www.youtube.com/watch?v=3-Ov3DYNN3Q, Jan. 31, 2011, 2 pages.
"Average Conversion Time for a D60 RAW file?" http://www.dpreview.com, Jul. 22, 2002, 4 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"Dropbox: Sync only specific folders," posted on Feb. 9, 2012, available online at http://www.tech-recipes.com/rx/20865/dropbox-sync-only-specific-folders/, 4 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
"Understanding Metadata," National Information Standards Organization, NISO Press, 2004, 20 pages.
Burney, "How to Move Document from Your Computer to Your iPad and Back Again," May 31, 2011, 3 pages.
Burns, "Developing Secure Mobile Applications for Android," Oct. 2008, Version 1.0, 1-28 pages.

Cisco, "FTP Load Balancing on ACE in Routed Mode Configuration Example," DocWiki, Jun. 2011, 7 pages.
Cohen, "Debating the Definition of Cloud Computing Platforms," retrieved from the internet, http://forbes.com, Feb. 3, 2014, 7 pages.
Comes, "MediaXchange User's Manual," Version 1.15.15, Feb. 1, 2009, pp. 1-90.
Conner, "Google Apps: The Missing Manual," published by O'Reilly Media, May 27, 2008, 24 pages.
Conner, "Google Apps: The Missing Manual," published by O'Reilly Media, May 27, 2008, 42 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP 13177108.1, Applicant: Box, Inc. dated Feb. 17, 2015, 6 pages.
Exam Report for EP 13185269.1, Applicant: Box, Inc., dated Feb. 13, 2015, 8 pages.
Exam Report for EP13158415.3, Applicant: Box, Inc. dated Jun. 4, 2013, 8 pages.
Exam Report for EP13168784.0, Applicant: Box, Inc. dated Nov. 21, 2013, 7 pages.
Exam Report for EP13177108.1, Applicant: Box, Inc. dated May 26, 2014, 6 pages.
Exam Report for EP13185269.1, Applicant: Box, Inc. dated Jan. 28, 7 pages.
Exam Report for GB1300188.8, Applicant: Box, Inc. dated May 31, 2013, 8 pages.
Exam Report for GB1306011.6, Applicant: Box, Inc. dated Apr. 18, 2013, 8 pages.
Exam Report for GB1308842.2, Applicant: Box, Inc. dated Mar. 10, 2014, 4 pages.
Exam Report for GB1309209.3 Applicant: Box, Inc. dated Jan. 19, 2015, 6 pages.
Exam Report for GB1309209.3 Applicant: Box, Inc. dated Oct. 7, 2014, 3 pages.
Exam Report for GB1309209.3, Applicant: Box, Inc. dated Oct. 30, 2013, 11 pages.
Exam Report for GB1310666.1, Applicant: Box, Inc. dated Aug. 30, 2013, 10 pages.
Exam Report for GB1311417.8 Applicant: Box, Inc. dated Nov. 7, 2014, 2 pages.
Exam Report for GB1311417.8, Applicant: Box, Inc. dated Dec. 23, 2013, 5 pages.
Exam Report for GB1311421.0 Applicant: Box, Inc. dated Nov. 7, 2014, 4 pages.
Exam Report for GB1312095.1 Applicant: Box, Inc. dated Nov. 19, 2014, 5 pages.
Exam Report for GB1312095.1, Applicant: Box, Inc. dated Dec. 12, 2013, 7 pages.
Exam Report for GB1312264.3, Applicant: Box, Inc. dated Jan. 30, 2015, 5 pages.
Exam Report for GB1312264.3, Applicant: Box, Inc. dated Mar. 24, 2014, 7 pages.
Exam Report for GB1312874.9 Applicant: Box, Inc. dated Sep. 26, 2014, 2 pages.
Exam Report for GB1312874.9, Applicant: Box, Inc. dated Dec. 20, 2013, 11 pages.
Exam Report for GB1312874.9, Applicant: Box, Inc. dated Feb. 10, 2015, 7 pages.
Exam Report for GB1313559.5 Applicant: Box, Inc. dated Nov. 4, 2014, 2 pages.
Exam Report for GB1313559.5, Applicant: Box, Inc., dated Aug. 22, 2013, 19 pages.
Exam Report for GB1314771.5, Applicant: Box, Inc. dated Feb. 17, 2014, 7 pages.
Exam Report for GB1315232.7 Applicant: Box, Inc. dated Oct. 9, 2014, 5 pages.
Exam Report for GB1316532.9, Applicant: Box, Inc. dated Oct. 31, 2013, 10 pages.

(56) References Cited

OTHER PUBLICATIONS

Exam Report for GB1316532.9, Applicant: Box, Inc., dated Mar. 27, 2015, 6 pages.
Exam Report for GB1316533.7, Applicant: Box, Inc. dated Oct. 8, 2013, 9 pages.
Exam Report for GB1316682.2 Applicant: Box, Inc. dated Nov. 19, 2014, 6 pages.
Exam Report for GB1316685.5, Applicant: Box, Inc. dated Feb. 17, 2015, 5 pages.
Exam Report for GB1316971.9, Applicant: Box, Inc. dated Nov. 26, 2013, 10 pages.
Exam Report for GB1317393.5 Applicant: Box, Inc. dated Nov. 7, 2014, 6 pages.
Exam Report for GB1317600.3, Applicant: Box, Inc. dated Nov. 21, 2013, 8 pages.
Exam Report for GB1318373.6, Applicant: Box, Inc. dated Dec. 17, 2013, 4 pages.
Exam Report for GB1318789.3 Applicant: Box, Inc. dated Oct. 30, 2014, 6 pages.
Exam Report for GB1318792.7, Applicant: Box, Inc. dated May 22, 2014, 2 pages.
Exam Report for GB1320902.8, Applicant: Box, Inc. dated Dec. 20, 2013, 6 pages.
Exam Report for GB1410569.6 Applicant: Box, Inc. dated Jul. 11, 2014, 9 pages.
Exam Report for GB1415126.0 Applicant: Box, Inc. dated Oct. 2, 2014, 8 pages.
Exam Report for GB1415314.2 Applicant: Box, Inc. dated Oct. 7, 2014, 6 pages.
Extended Search Report for EP131832800, Applicant: Box, Inc. dated Aug. 25, 2014, 7 pages.
Extended Search Report for EP141509422, Applicant: Box, Inc. dated Aug. 26, 2014, 12pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 dated Oct. 6, 2011, pp. 1-13.
International Search Report and Written Opinion for PCT/US2011/041308 dated Jul. 2, 2012, pp. 1-16.
International Search Report and Written Opinion for PCT/US2011/047530, Applicant: Box, Inc., dated Mar. 22, 2013, pp. 1-10.
International Search Report and Written Opinion for PCT/US2011/056472 dated Jun. 22, 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30, 2012, pp. 1-10.
International Search Report and Written Opinion for PCT/US2012/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/070366, Applicant: Box, Inc., dated Apr. 24, 2013, 10 pages.
International Search Report and Written Opinion for PCT/US2013/020267, Applicant: Box, Inc., dated May 7, 2013, 10 pages.
International Search Report and Written Opinion for PCT/US2013/023889, Applicant: Box, Inc., dated Jun. 24, 2013, 13 pages.
International Search Report and Written Opinion for PCT/US2013/029520, Applicant: Box, Inc., dated Jun. 26, 2013, 10 pages.
International Search Report and Written Opinion for PCT/US2013/034662, Applicant: Box, Inc., dated May 31, 2013, 10 pages.
International Search Report and Written Opinion for PCT/US2013/034765, Applicant: Box, Inc., dated Jan. 20, 2014, 15 pages.
International Search Report and Written Opinion for PCT/US2013/035404, Applicant: Box, Inc., dated Jun. 26, 2013, 11 pages.
International Search Report and Written Opinion for PCT/US2013/039782, Applicant: Box, Inc., dated Aug. 28, 2013, 15 pages.
Internet Forums, http://web.archive.org/web/20100528195550/http://en.wikipedia.org/wiki/Internet_forums, Wikipedia, May 30, 2010, pp. 1-20.
John et al., "Always Sync Support Forums—View topic—Allway sync funny behavior," Allway Sync Support Forum at http://sync-center.com, Mar. 28, 2011, XP055109680, 2 pages.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Microsoft Windows XP Professional Product Documentation: How Inheritance Affects File and Folder Permissions, Apr. 11, 2014, 2 pages.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Partial Search Report for EP131832800, Applicant: Box, Inc. dated May 8, 2014, 5 pages.
Patent Court Document of Approved Judgment for GB0602349.3 and GB0623571.7; Mar. 3, 2009, 17 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP 11729851.3, Applicant: Box, Inc. dated Feb. 7, 2014, 9 pages.
Search Report for EP 13189144.2 Applicant: Box, Inc. dated Sep. 1, 2014, 9 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Search Report for EP14151588.2, Applicant: Box, Inc. dated Apr. 15, 2014, 12 pages.
Search Report for EP14153783.7, Applicant: Box, Inc. dated Apr. 7, 2014, 6 pages.
Sommerer, "Presentable Document Format: Improved On-demand PDF to HTML Conversion," retrieved from the internet, http://research.microsoft.com, Nov. 2004, 8 pages.
Supplementary European Search Report European Application No. EP 08 85 8563 dated Jun. 20, 2011 pp. 1-5.
Tulloch et al., "Windows Vista Resource Kit," Apr. 8, 2007, Microsoft Press, XP055113067, 6 pages.
User's Guide for SMART Board Software for Windows, published Dec. 2004, 90 pages.
Walker, "PDF.js project meeting notes," retrieved from the internet, http://groups.google.com, May 15, 2014, 1 page.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Zambonini et al., "Automated Measuring of Interaction with User Interfaces," Published as WO2007113573 Oct. 2007, 19 pages.

\* cited by examiner

CONFIGURABLE METADATA-BASED AUTOMATION AND CONTENT CLASSIFICATION ARCHITECTURE FOR CLOUD-BASED COLLABORATION PLATFORMS

CROSS-REFERENCE TO RELATED APPLICATION(S)

This present application is a continuation of U.S. patent application Ser. No. 14/474,008, filed on Aug. 29, 2014, titled "CONFIGURABLE METADATA-BASED AUTOMATION AND CONTENT CLASSIFICATION ARCHITECTURE FOR CLOUD-BASED COLLABORATION PLATFORMS," which is related to U.S. patent application Ser. No. 14/056,899 titled "CONFIGURABLE EVENT-BASED AUTOMATION ARCHITECTURE FOR CLOUD-BASED COLLABORATION PLATFORMS, filed on Sep. 13, 2013, the contents of which are incorporated by reference in their entireties.

BACKGROUND

As electronic and digital content use in enterprise settings and/or other organizational settings has become the preferred mechanism for project, task, and work flow management, so has the need for streamlined collaboration and sharing of digital content and documents. In such collaboration environments, multiple users share, access, and otherwise perform actions or tasks on content and files in shared workspaces.

When a user performs an action on a file in a collaboration environment, a corresponding job can be scheduled. For example, in response to a file being uploaded, the file might responsively be scanned. Current automation architectures for collaboration environments provide a mechanism to kick off the jobs at the front-end (e.g., at the web or application servers). Unfortunately, these current architectures are not easily scalable and do not provide for customizations of the jobs to be performed responsive to particular actions in a distributed computing environment.

DETAILED DESCRIPTION

Figure 1:
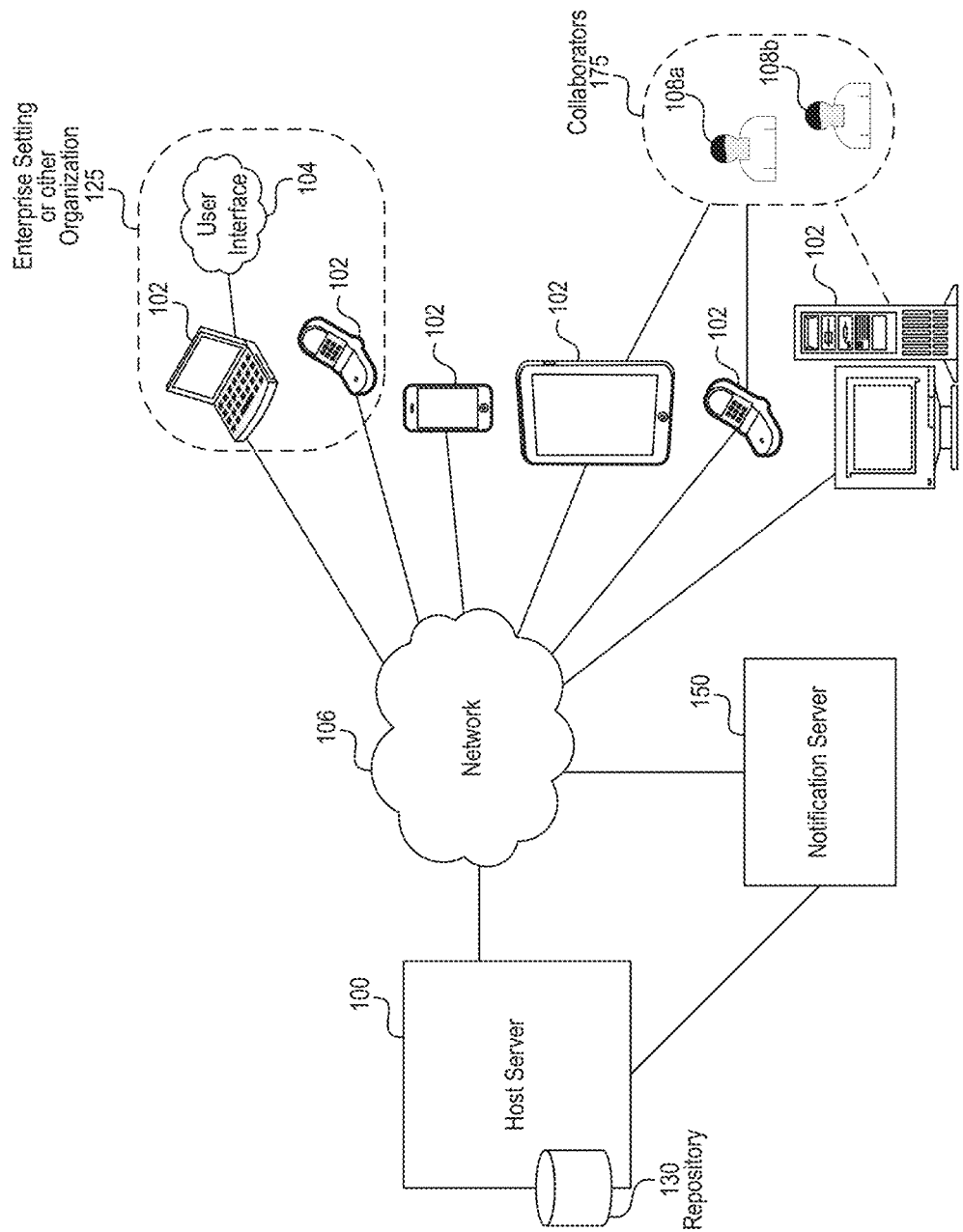
FIG. 1 illustrates a diagram of an example system having a host server of a cloud service and/or cloud storage accounts in a configurable event-based automation architecture.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Scalable architectures, systems, and services are provided herein for generating jobs by applying user-specified rules to various metadata events. More specifically, the scalable architecture described herein uses metadata to drive automations and/or polices in a cloud-based environment.

In one embodiment, the architecture integrates a metadata service with an event-based automation engine to automatically trigger polices and/or automations based on metadata and/or metadata changes. The metadata service can include customizable and/or pre-build templates via a templating system. The templates can be used to automatically apply a metadata framework (e.g., particular fields) to files based on, for example, the upload or placement of a particular file in a particular folder. The automation engine tracks the metadata and/or changes to the metadata and can responsively kick off jobs (e.g., notifications, policies, workflows, etc.). The architecture also provides for advanced metadata searching and data classification. For example, when a user uploads a file and classifies it using metadata as highly confidential, this can trigger a particular policy or automation.

In one embodiment, the scalable architectures also facilitate support for a dynamic set of customizable metadata rules or conditions and job descriptions. The scalable architectures are distributed and fault tolerant.

Definitions:

Action: A user action can include, for example, file operation actions like uploads or previews, as well as collaboration operations like task assignment and comments. The user actions are logged by the action log framework.

Job: A job consists of asynchronous work that needs to be executed as a result of an action. For example, a job can include notification to a user or conversion of a specific file. The jobs are described using a set of parameters specific to the work to be executed, as well as the action log data of the event that triggered the job and any routing information required.

Rule: A rule defines what jobs are generated given a particular action. More than one rule can be triggered given an action and multiple jobs can be generated from a single rule.

Rule Manager: A rule manager is responsible for managing rules and applying rules to incoming actions. The jobs generated are forwarded to the job manager.

Job Manager: A job manager is responsible for tracking job statuses and distributing work to worker machines.

Embodiments of the present disclosure describe an architecture including systems and methods for configurable event-based automation in a cloud-based collaboration platform or environment.

FIG. 1 illustrates an example diagram of a system having a host server 100 of a cloud service and/or cloud storage accounts in a configurable event-based automation architecture.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and app server 110 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination or variation of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such that each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a work space.

Figure 2:
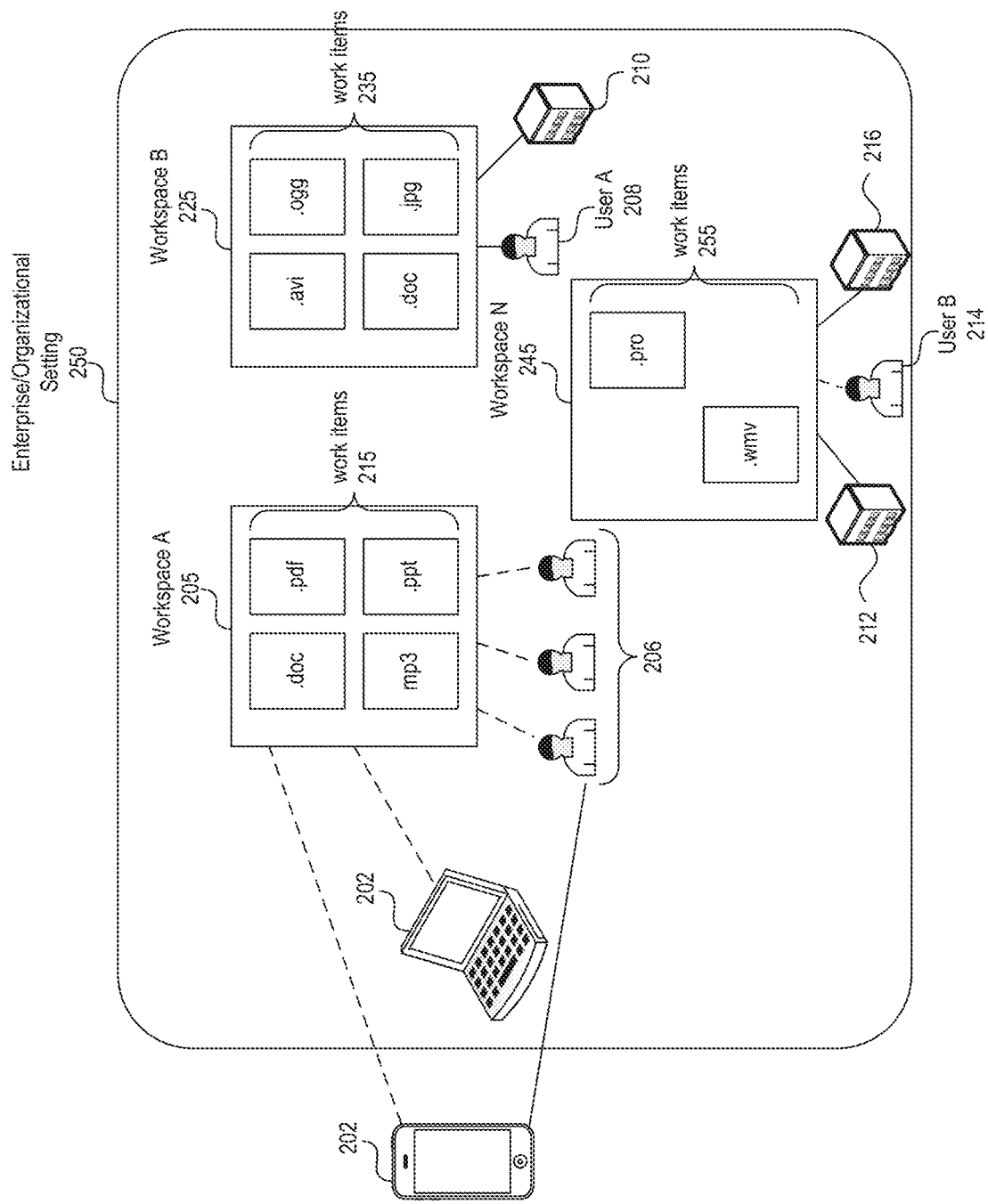
FIG. 2 depicts a diagram of an example web-based or online collaboration platform deployed in an enterprise or other organizational setting for organizing work items and workspaces, as one example of a hosted cloud service and/or cloud storage accounts in a configurable event-based automation architecture.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, client devices 102 communicates with the host server 100 and/or people search engine 150 over network 106. In general, network 106, over which the client devices 102, the host server 100, and/or people search engine 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

A diagrammatic illustration of the cloud-based environment (e.g., collaboration environment) and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, actions performed on work items or other activities that occur in a workspace can be detected in real time or in near real time. The host server can generate notifications or notification events for one or more of the plurality of activities and select one or more recipients for each notification. Various mechanisms or external messaging applications can then be used to notify users or collaborators, including through the web interface to access the collaboration platform, via email, and/or SMS, for example.

In one embodiment, the host server can comprise a distributed system including both front-end and back-end components (systems). Although not shown, the host server can include an action log, an event dispatcher, one or more processors, one or more databases, and one or more real time clients. Together these components are generally referred to herein as an "action log framework" (ALF). Components of the ALF may reside in the front-end systems, the back-end systems, or a combination thereof.

In one embodiment, the event dispatcher (also referred to as the event manager dispatcher, see e.g., FIG. 14), accumulates events and dispatches and/or otherwise distributes the events to one or more rule managers. As described herein, the event-based automation engine includes a rule-based engine to automatically translate each event into one or more jobs based on user-specified rules (e.g., administrator-specified rules) and the job manager FIG. 2 depicts a diagram of a web-based or online collaboration platform deployed in an enterprise or other organizational setting 250 for organizing work items 215, 235, 255 and workspaces 205, 225, 245, as one example of a hosted cloud file sharing, collaboration service and/or cloud storage service in a configurable event-based automation architecture.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A-N) may be created to support different projects or a variety of work flows. Each workspace may have its own associate work items. For example, work space A 205 may be associated with work items 215, work space B 225 may be associated with work items 235, and work space N may be associated with work items 255. The work items 215, 235, and 255 may be unique to each work space but need not be. For example, a particular word document may be associated with only one work space (e.g., work space A 205) or it may be associated with multiple work spaces (e.g., work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 may be associated with departments 212 and 216 and users shown as example user B 214.

Each user associated with a work space may generally access the work items associated with the work space. The level of access may depend on permissions associated with the specific work space, and/or with a specific work item. Permissions may be set for the work space or set individually on a per work item basis. For example, the creator of a work space (e.g., one of user A 208 who creates work space B) may set one permission setting applicable to all work items 235 for other associated users and/or users associated with the affiliate department 210, for example. Creator user A 208 may also set different permission settings for each work item, which may be the same for different users, or varying for different users.

In each work space A, B, N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, and creating a discussion topic in the work space.

In some embodiments, items or content (content items) downloaded or edited in accordance with the techniques described in the present disclosure can cause notifications to be generated. Such notifications can be sent to relevant users to notify them of actions surrounding a download, an edit, a change, a modification, a new file, a conflicting version, an upload of an edited or modified file. Additionally, as discussed above, actions performed on the content items can be maintained by an ALF system.

In one embodiment, in a user interface of the web-based collaboration platform where notifications are presented, users can, via the user interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
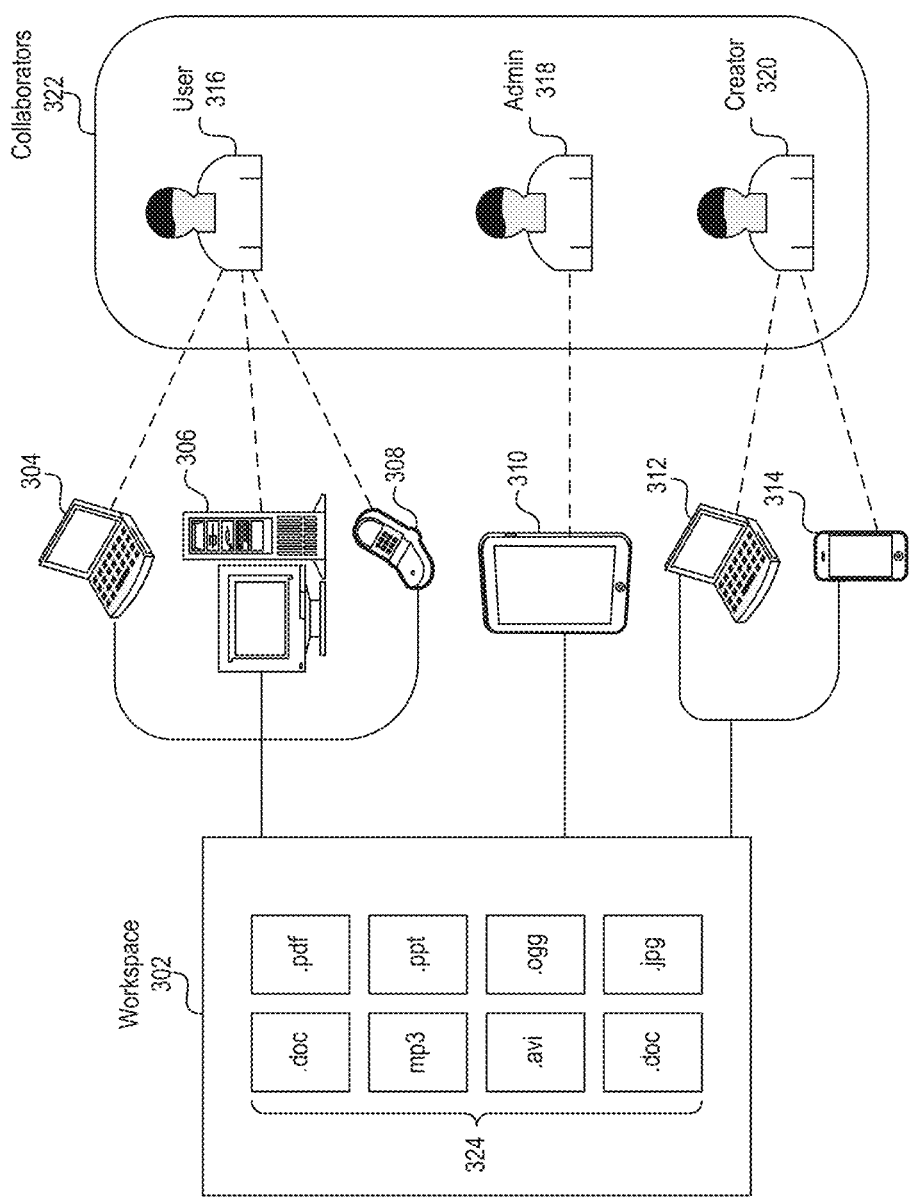
FIG. 3 depicts a diagram of an example workspace in a cloud-based, online or web-based collaboration environment accessible by multiple collaborators through various devices authorized to access the work space.

FIG. 3 depicts an example diagram of a workspace 302 in an online or web-based collaboration environment accessible by multiple collaborators 322 through various devices authorized to access the work space.

Each of users 316, 318, and 320 may individually use multiple different devices to access and/or manipulate work items 324 (e.g., content items) in the work space 302 with which they are associated with. For example, users 316, 318, 320 may be collaborators on a project to which work items 324 are relevant. Since the work items 324 are hosted by the collaboration environment (e.g., a cloud-based environment), each user may access the work items 324 anytime, and from any physical location using any device (e.g., including devices they own or any shared/public/loaner device).

Work items to be edited or viewed may be accessed from the workspace 302 in accordance with the platform and/or application independent mechanisms. Users may also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification may be depicted preferentially (e.g., ordering in the user interface) based on user preferences and/or relevance to the user (e.g., implicit or explicit).

For example, a notification of a download, access, read, write, edit, or upload related activities may be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query who they wish to be collaborators in a common work space.

Work items hosted by a collaboration environment (e.g., a cloud-based collaboration environment) can be accessed by users (e.g., users 316, 318, and 320) via multiple different devices (e.g., devices 304-314) for viewing, editing, processing or performing other manipulations on work items. The devices can include applications for accessing a server hosting a cloud-based platform or service or other back-end web services (hereinafter "cloud-based collaboration platform application") and applications for viewing, editing, processing, or performing other manipulations on work items. The communication between such applications are generally facilitated by a communication mechanism of the OS. For example, in Android OS, the communication mechanism is based on "Intents". As previously described, the underlying communication mechanism is generally insecure, and any data passed between applications is visible to all other applications on a device.

Figure 4:
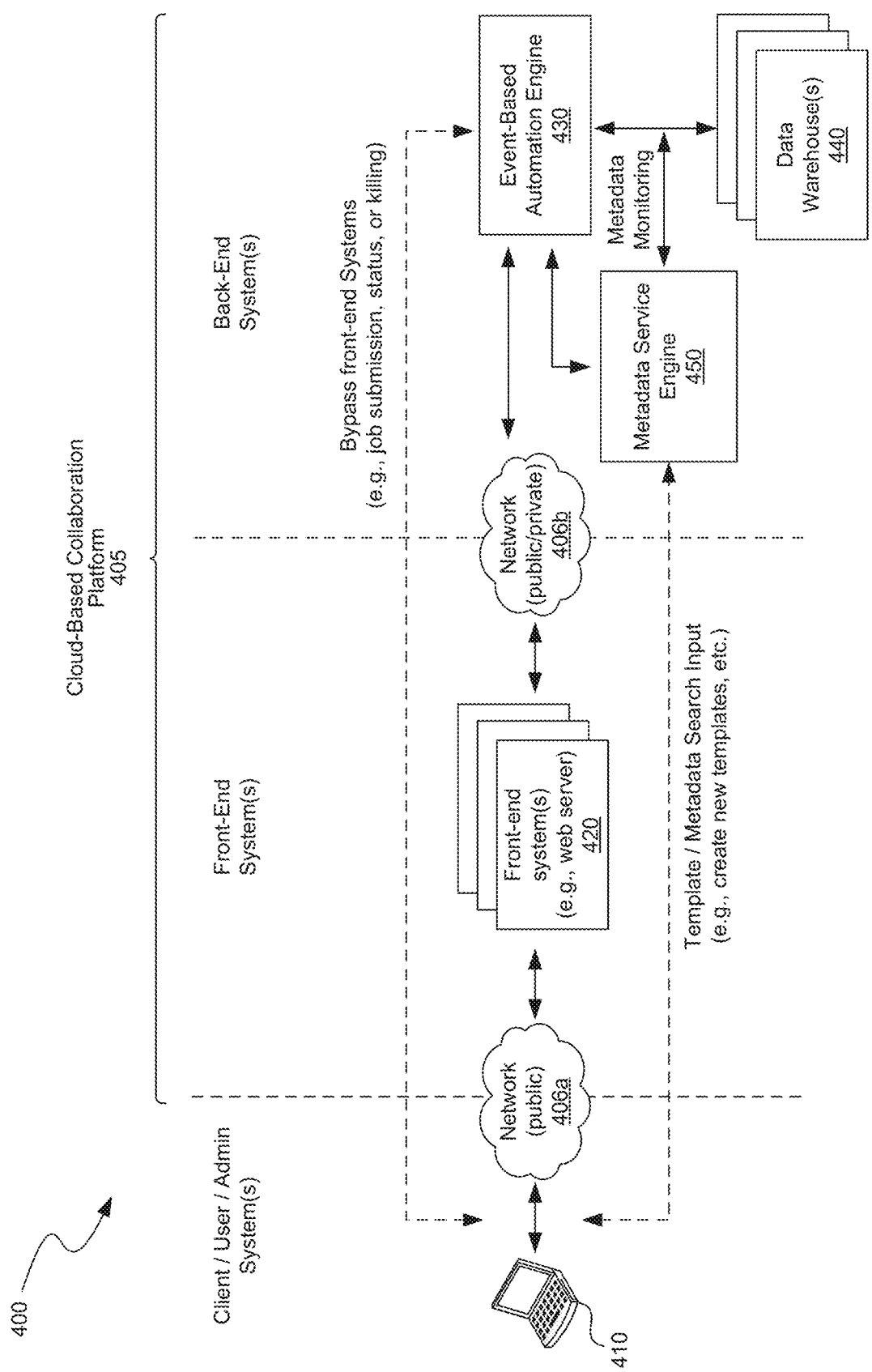
FIG. 4 depicts a diagram illustrating an example event-based automation architecture for cloud-based collaboration platforms including a user-configurable back-end event-based automation engine.

FIG. 4 depicts a diagram illustrating an example event-based automation architecture 400 for a cloud-based collaboration platform 405 including a user-configurable back-end event-based automation engine 430 and a metadata service engine 450. As shown, the event-based automation architecture 400 can include various client (or user or administer) systems 410 and the cloud-based collaboration platform 405. Notably, as illustrated and discussed in the example of FIG. 4, placement of the event-based automation engine 430 is in the back-end of the cloud-based architecture providing scalability in the architectural design.

In one embodiment, the cloud-based collaboration platform 405 can include the host server 100 and/or the notification server 150 of FIG. 1. The cloud-based collaboration platform 405 can include various front-end system(s) and back-end system(s) that can be physically and/or functionally distributed. As shown, the cloud-based collaboration platform 405 includes front-end system 420 (e.g., a web server), a back-end even-based automation engine 430, various data warehouse(s) 440, and a metadata service engine 450. The client systems 410 can be configured to communicate via the network 406a with the front-end system(s) 420. Similarly, the front-end system(s) 420 can be configured to communicate with the client or user system(s) 410 and the event-based automation engine 430 via the network 406b, and the event-based automation engine 430 can be configured to communicate with the front-end system(s) 420 via the network 406b and the data warehouses 440.

Additionally, in some embodiments, an administrator system 410 can be configured to bypass the front-end systems in order to directly submit a job, determine the status of a job, kill a job, etc. via a web interface or application program interface built into the event-based automation engine 430. In some embodiments, clients, users and/or administrators can access the metadata service engine 450 in order to select, configure, and/or generate templates or provide input for metadata searching.

In one embodiment, the front-end system(s) 420 can include various web applications and/or web servers. Additionally, in some embodiments, the front-end system(s) 420 can provide ALF events to the event-based automation engine 430. As discussed in greater detail with reference to FIG. 6, the back-end event-based automation engine 430 can include a rule-based engine and a computing platform. The rules based engine can be configured to generate and manage user-defined (or specified) rules and apply the rules to incoming ALF events. The computing platform includes a jobs manager configured to generate jobs based on job requests, track the job statuses, and distribute work to workers. The various components, functions, and or tools that can be associated with and/or included within an event-based automation engine are discussed in greater detail with reference to FIG. 6.

In one embodiment, the rules-based engine can be configured to generate and manage user-defined (or specified) metadata rules and apply the metadata rules to metadata events generated by the metadata service engine 450. As described in greater detail with reference to FIG. 5, the metadata service engine 450 monitors metadata (e.g., job requests, events, actions, etc.) to identify changes to metadata. The metadata events can be generated responsive to these metadata changes. As described herein, the metadata service engine 450 can provide the ability to generate and/or select templates for providing a metadata framework to particular work items. Additionally, the metadata service engine 450 provides the ability to search metadata in the cloud-based environment.

Figure 5:
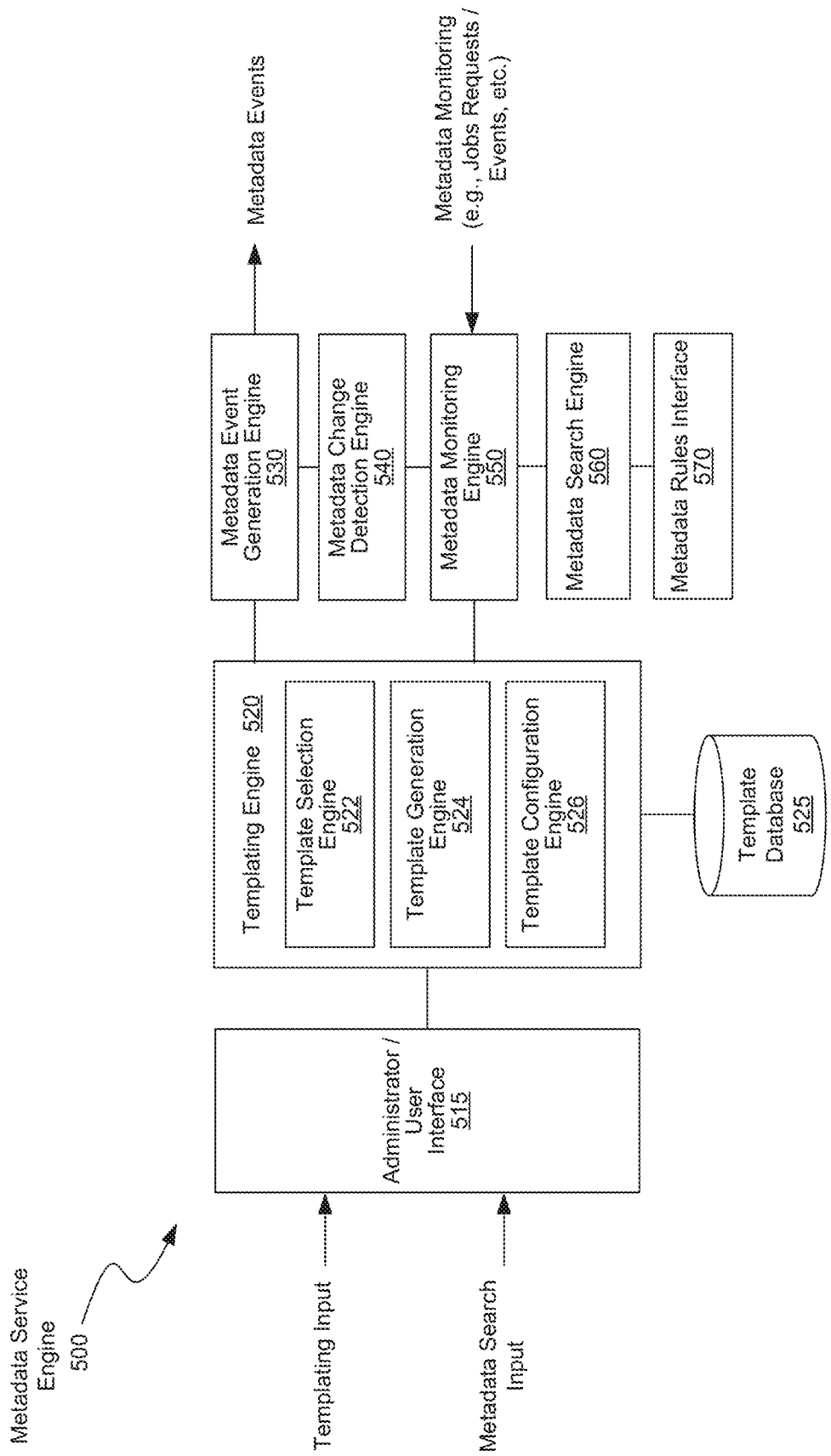
FIG. 5 depicts a diagram illustrating an example metadata service engine.

FIG. 5 depicts a diagram illustrating an example metadata service engine 500. The metadata service engine 500 can be the metadata service engine 450 of FIG. 4, although alternative configurations are possible. As shown in the example of FIG. 5, the metadata service engine includes an administrator/user interface 515, a templating in engine 520, a template database 525, a metadata event generation engine 530, a metadata chance detection engine 540, a metadata monitoring engine 550, a metadata search engine 560, and a metadata rules interface 570. The templating engine 520 includes a template selection engine 522, template generation engine 524, and a template configuration engine 526.

Additional or fewer components/modules/engines can be included in the metadata service engine 500 and/or in each illustrated component/module/engine. Further, although illustrated as included as part of the metadata service engine 500, the components/modules/engines and/or the template databases 525 can be physically and/or functionally distributed.

One embodiment of the metadata service engine 500 includes the administrator/user interface 515. The administrator/user interface 515 can comprise any interface configured to facilitate receiving and processing of templating inputs for selection, configuration, and/or generation of metadata templates. For example, the administrator/user interface 515 can include a network interface having a networking module that enables the metadata service engine 500 to mediate data in a network with an entity that is external to the metadata service engine 500, through any known and/or convenient communications protocol supported by the host and the external entity. The network interface can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, a bridge router, a hub, a digital media receiver, and/or a repeater.

Additionally, the administrator/user interface 515 can comprise any interface configured to facilitate receiving of metadata search input. As discussed below, the administrator/user interface 515 interacts with the metadata search engine 560 to provide users and/or administrators the ability to search by metadata.

One embodiment of the metadata service engine 500 includes the templating engine 520. The templating engine 520 can include customizable and/or pre-build metadata templates which can be used to automatically apply a metadata framework (e.g., particular fields) to files (or work items) based on, for example, the upload or placement of a particular file in a particular folder, selection of those files by a user or administrator, and/or in other manners discussed herein or known in the art. As discussed above, the templating engine 520 includes a template selection engine 522, template generation engine 524, and a template configuration engine 526. The template selection engine 522 is configured to select one or more pre-configured templates for application of those templates to work items in the cloud-based collaborative environment. The template generation engine 524 and a template configuration engine 526 are configured to generate and configure metadata templates responsive to the templating input. One or more template database(s) 525 persistently stores the templates in the cloud-based collaborative environment.

One embodiment of the metadata service engine 500 includes the metadata event generation engine 530, the metadata chance detection engine 540, and the metadata monitoring engine 550. The metadata monitoring engine 550 monitors actions, events, jobs, job requests, etc. to identify changes to metadata occurring to work items within the collaborative cloud-based environment. The metadata change detection engine 540 detects these changes to the metadata and the metadata event generation engine 530 responsively generates the metadata events.

One embodiment of the metadata service engine 500 includes the metadata search engine 560. The metadata search engine 560 is configured to facilitate searching of the metadata in the collaborative cloud-based environment. In some embodiments, the metadata search engine 560 can index the metadata. For example, the metadata search engine 560 collects, parses, and stores data to facilitate fast and accurate metadata information retrieval.

One embodiment of the metadata service engine 500 includes the metadata rules interface 570. The metadata rules interface 570 is configured to interact with the rules engine to, for example, automatically provide rules to be generated based on configurations/customizations of metadata templates.

Figure 6:
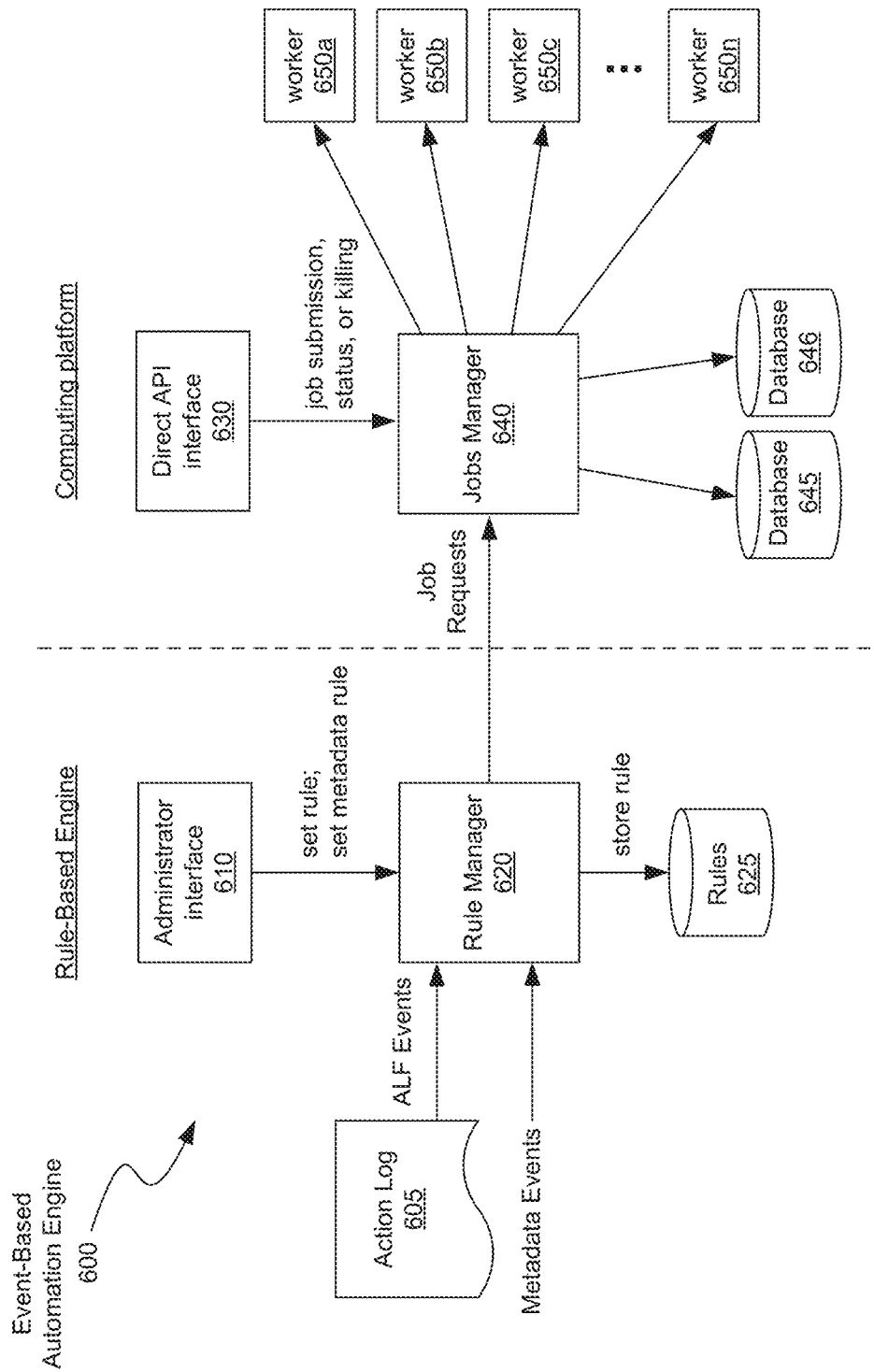
FIG. 6 depicts a diagram illustrating an example event-based automation engine including a rule-based engine and a computing platform.

FIG. 6 depicts a diagram illustrating example event-based automation engine 600 including a rule-based engine and a computing platform. The event-based automation engine 600 can be the event-based automation engine 430 of FIG. 4, although alternative configurations are possible. As shown in the example of FIG. 6, the rules-based engine includes an action log 605, an administrator interface 610, a rule manger 620, and a rule database 625. The computing platform includes a direction application program interface (API) 630, a jobs manager 620, multiple storage databases 645 and 646, and multiple workers 650A-N.

The rule manager 620 can include any system and/or service that is configured to receive incoming ALF events and/or metadata events and apply rules (or metadata rules) to the events to automatically generate corresponding job requests and send the job requests to the jobs manager 640. The administrator interface 610 allows administrative users to generate (or set) rules or metadata rules which are then stored, by the rule manager 620, in the rules database 625. An example rules manager is discussed in greater detail with reference to FIG. 7.

The jobs manager 640 can, among other functions, receive job requests from the rule manager, generate jobs corresponding to job requests, determine relevant queues for jobs, route jobs to relevant queues for performance by workers, and track and/or otherwise monitor the status of each of the jobs. In addition to supporting content workflow, the job manager is also intended to be a general-purpose job system that can provide asynchronous job execution for other services. An example jobs manager is discussed in greater detail with reference to FIG. 8. The workers 650A-N can comprise distributed machines or computers in one or more computer clusters.

Figure 7:
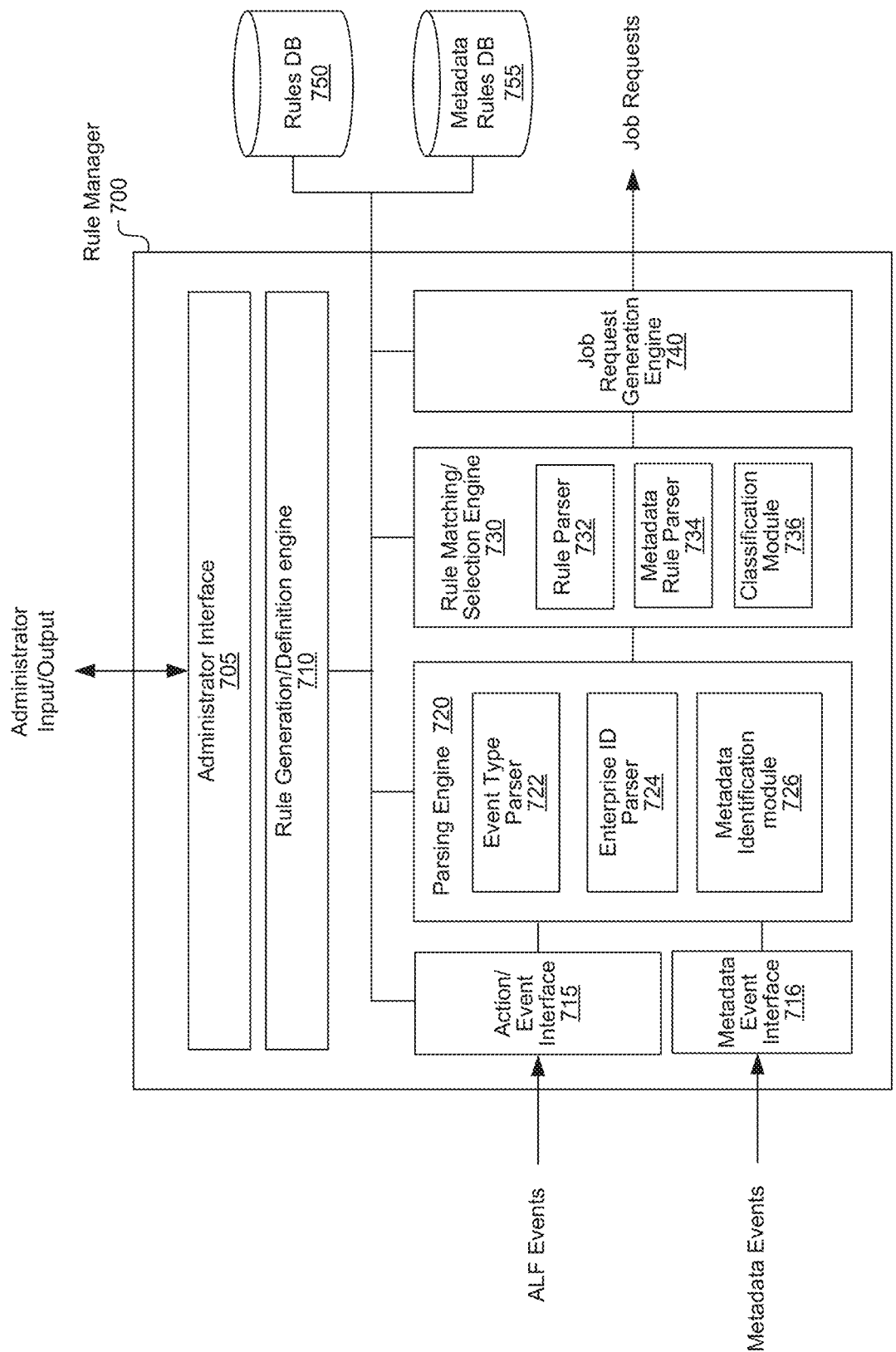
FIG. 7 depicts a block diagram illustrating example components of a rule manager of a rule-based engine for automatically translating events into one or more job requests based on user (or administrator) specified rules.

FIG. 7 depicts a block diagram illustrating example components of a rule manager 700 of a rule-based engine. The rule manager 700 can be configured to automatically translate ALF events into one or more job requests based on user (or administrator) specified rules. The rule manager 700 can be, for example, rule manager 620 of FIG. 6, although alternative configurations are possible.

The rule manager 700 can include an administrator interface 705, a rule generation/definition engine 710, an action/event interface 715, a metadata event interface 716, a parsing engine 720, a rule matching/section engine 730, and a job request generation engine 740. The parsing engine 720 can include an event type parser 622, an enterprise identifier (ID) parser 624, and a metadata identification module 726. As shown in the example of FIG. 7, the rule manager 700 also includes a rules database (DB) 750 and a metadata rules database (DB) 755.

Additional or fewer components/modules/engines can be included in the rule manager 700 and/or in each illustrated component/module/engine. Further, although illustrated as included as part of the rule manager 700, the components/modules/engines and/or the rules database 750 and/or the metadata rules database 755 can be physically and/or functionally distributed.

One embodiment of the rule manager 700 includes the administrator interface 705. The administrator interface 705 can comprise any interface configured to facilitate setting and/or generation of the user-defined rules by an administer. For example, the administrator interface 705 can include a network interface having a networking module that enables the rule manager 700 to mediate data in a network with an entity that is external to the rule manager 700, through any known and/or convenient communications protocol supported by the host and the external entity. The network interface can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, a bridge router, a hub, a digital media receiver, and/or a repeater.

One embodiment of the rule manager 700 includes the rule generation/definition engine 710. The rule generation/definition engine 710 facilitates rule generation/definition by users or administrators. For example, users can define rules in a rule descriptive language (RDL) that can be automatically triggered and executed by the rule manager. The users or administrators can also define metadata rules in a similar matter. Alternatively or additionally, metadata rules can be automatically generated and input into the system based on user-generated or pre-existing metadata templates defined by the metadata service engine 500.

Each rule can include one or more conditions that can be determined by the user and/or automatically by the system. Each condition is associated with a job. In operation, when a condition is evaluated to be true, the associated job is triggered and/or otherwise generated. Metadata rules can be defined in a similar fashion. Alternatively or additionally, metadata rules can be defined based on keys of key value pairs. In some embodiments, threshold or defined values for the metadata key-value pairs can be set that trigger the rule. For example, if the metadata template defines a contract, then one metadata attribute may be the value of the contract. A rule can be set that triggered a particular action or job in the event that the value of the contract exceeds a particular preset value. For instance, one or more notifications may be sent to particular individuals for review. Similarly, a metadata attribute of a contract template could include a status attribute that causes a particular action or job to be performed when the value of the key-value pair change from 'PENDING' to 'APPROVED'. In this manner, metadata or changes to metadata can trigger job requests (e.g., events or actions).

One embodiment of the rule manager 700 includes the action/event interface 715. The action/event interface 715 can receive events including ALF events. For example, the action/event interface 715 can receive events from an action log dispatcher (ALD) (also referred to as a dispatcher or an event manager dispatcher herein). In one embodiment, the ALD accumulates and distributes actions taken and logged by collaborators in the collaboration environment. The distributed events can be, for example, ALF events that indicate the user actions taken on content items in the web applications. The ALD can accumulate and distribute and/or otherwise provide sets of ALF events (e.g., multiple events) to the rule manager simultaneously. For example, in one embodiment, the ALF events can be distributed via an action such as, for example, action log 605 of FIG. 6.

One embodiment of the rule manager 700 includes the metadata event interface 716. The metadata event interface 716 can receive metadata events. For example, the metadata event interface 716 can receive metadata events from a metadata service engine such as, for example, metadata service engine 500 of FIG. 5. The metadata events can identify a change in a metadata key-value pair associated with a particular work item in the collaborative cloud-based environment. For example, a contract (work item) can include a metadata key-value pair including a key: value of contract and a value of that key: monetary value.

One embodiment of the rule manager 700 includes the parsing engine 720. The parsing engine 720 parses each of the events to identify event criteria associated with the event such as, for example, an action type and/or an enterprise identifier (ID). The parsing engine 720 can also parse and/or otherwise process the metadata events and identify the relevant information such as, for example, the associated key-value pair.

The example rule manger 700 of FIG. 7 is shown including an event type parser 722, an enterprise ID parser 724, and a metadata identification module 726; however, it is appreciated that other (any) criteria can be parsed from the event (or metadata events) via the parsing engine 720.

One embodiment of the rule manager 700 includes the rule matching/selection engine 730. The rule matching/selection engine 730 is configured to access pre-defined rules from the rules database 750, and scan the pre-defined rules to select pre-defined rules that match particular event criteria. For example, the rule manger 700 can utilize filters (or criteria) to select or match ALF events with rules. Example filters include, but are not limited to, enterprise_id, all_enterprises, all_users, and event type. Additionally, the rule matching/selection engine 730 can parse the metadata rules to select pre-defined rules that match a particular key and/or value of a key value pair associated with a particular metadata event.

In one embodiment, the rule matching/selection engine 730 includes a rule parser 732, a metadata rules parser 734, and a classification module 736. The rule parser 732 is configured to parse the rules to identify one or more conditions associated with the rule and the corresponding job descriptions (also referred to herein as job templates) that are triggered if the condition occurs. The job descriptions are embedded in the rules and define the job to be performed. For example, each job indicates a process or type of work that is to be performed by one of the workers (e.g., distributed processing machines).

The metadata rule parser 734 is configured to parse the metadata rules to identify one or more keys and or values that match the key-value pair associated with the metadata event. For example, the metadata rule parser 734 can determine a pre-defined metadata rule that matches the key of the key-value pair.

One embodiment of the rule manager 700 includes the job request generation engine 740. The job request generation engine 740 is configured to generate one or more job requests for each rule. For example, in one embodiment, the job request generation engine 740 generates a job request based on each job description (or job template) corresponding to each rule condition. As discussed above, the jobs indicate work to be performed by workers (e.g., workers 650 of FIG. 6). The job request generation engine 740 is also configured to process key-value pairs associated with the metadata events to conditionally generate job requests (e.g., if the rule is triggered). For example, the job request generation engine 740 can determine a value of the metadata key-value pair associated with a particular work item, process the first pre-defined metadata rule that matches the key of the key-value pair, identify a threshold value associated with the first pre-defined metadata rule and compare the value of the metadata key-value pair with the threshold value. The job request can then be generated if the rule is triggered. That is, the job request can be conditionally generated based on the comparison.

Figure 8:
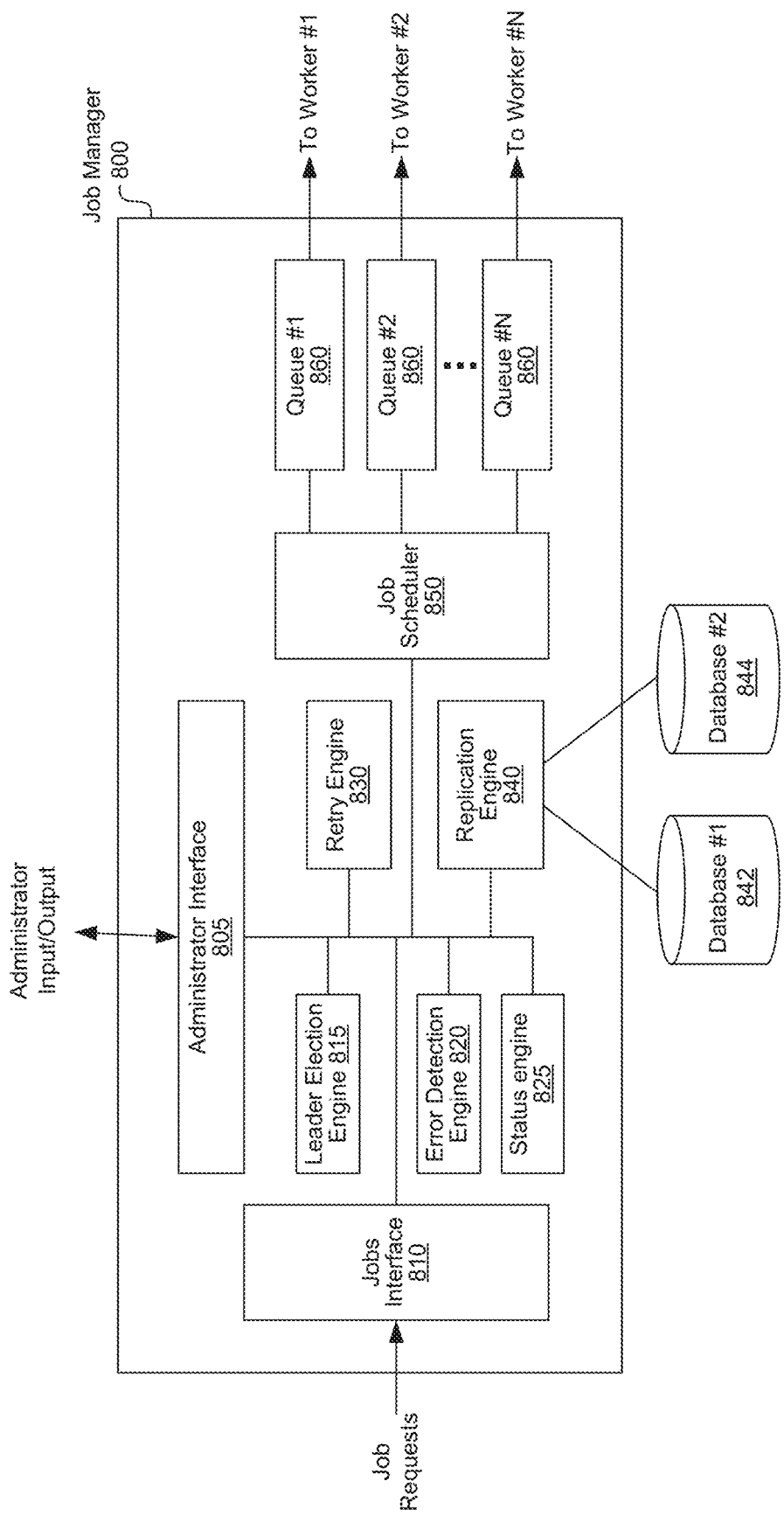
FIG. 8 depicts a block diagram illustrating example components of a job manager of a computing platform for queuing jobs and ensuring job execution.

FIG. 8 depicts a block diagram illustrating example components of a job manager 800 of a computing platform for generating, queuing, and ensuring job execution. The job manager 800 can, among other functions, route jobs to relevant queues 860 for performance by workers and track and/or otherwise monitor the status of each of the jobs. The job manager 800 can be, for example, job manager 640 of FIG. 6, although alternative configurations are possible.

The job manager 800 can include an administrator interface 805, a jobs interface 810, a leader election engine 815, an error detection engine 820, a status engine 825, a retry engine 830, a replication engine 840, a job scheduler 850, and various queues 860. As shown in the example of FIG. 8, the job manager 800 also includes storage databases 842 and 844, although these database can be considered as distinct in some embodiments. Additional or fewer components/modules/engines can be included in the rule manager 800 and/or in each illustrated component/module/engine. Further, although illustrated as included as part of the jobs manager 800, the components/modules/engines and/or the storage databases 842 and 844 can be physically and/or functionally distributed.

One embodiment of the jobs manager 800 includes the administrator interface 805. The administrator interface 805 can comprise any interface (e.g., a web interface) configured to facilitate direct administrator access for job submission, job status, or killing of jobs. In one embodiment, the administrator interface 805 can include a network interface having a networking module that enables the jobs manager 800 to mediate data in a network with an entity that is external to the jobs manager 800, through any known and/or convenient communications protocol supported by the host and the external entity. The network interface can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, a bridge router, a hub, a digital media receiver, and/or a repeater.

One embodiment of the jobs manager 800 includes the jobs interface 810. The jobs interface 810 can receive jobs including batched jobs. As discussed above, the jobs indicate work to be performed by workers (e.g., workers 650 of FIG. 6).

One embodiment of the jobs manager 800 includes the jobs interface leader election engine 815. As described herein, multiple instances of the job manager can be utilized in a distributed environment to prevent data loss and facilitate scalability. The leader election engine 815 can be used to guarantee that only one instance of the job manager 800 is performing operations so that the operations are not duplicated. For example, in one embodiment, the leader election engine 815 is utilized to ensure that only one service in each cluster is retrying and/or replicating jobs.

One embodiment of the jobs manager 800 includes the error detection engine 820. For example, the error detection engine 820 can provide infinite loop detection. That is, in some cases, users/admins can generate rules that create an infinite loop such as, for example:

Rule 1: Condition/Job
    If a file is uploaded/moved to folder A/move file to folder B;
Rule 2: Condition/Job
    If a file is moved to folder B/move file to folder A.

In one embodiment, the error detection engine 820 prevents such scenarios by injecting a unique token into the worker initiated API requests. The token flows through the API and web app and back into the ALF stream with the associated event. The rule manager can then pass the token along to the job manager where the job manager prevents jobs from being queued if the token had been seen too many times. Otherwise, the token would be added to the new job and the workers would need to reuse the token when executing the job.

One embodiment of the jobs manager 800 includes the status engine 825. The status engine 825 can track and/or otherwise monitor the status of jobs submitted to the queues. The status engine 825 ensures that jobs are executed. In one embodiment, jobs and status updates (started, completed, failed) are persisted in a local database (e.g., the local HBase cluster). The status engine 825 also responds to status queries received at the administrator interface (or web interface).

In one embodiment, status or progress cache is maintained by the job manager. The status or progress cache can provide status and/or progress updates (i.e., 10%, 20%, etc.) of jobs completed to interested clients (administrators). Additionally, as discussed above, the job manager supports an API or administer interface for receiving these updates from the workers and then providing the details to clients via a job status query response. In one embodiment, because of the temporary nature of the updates, rather than storing the updates in HBase, the job manager will store them in memcache.

One embodiment of the jobs manager 800 includes the replication engine 840. The replication engine 840 can save or store the jobs to first and second databases 842 and 844. Each database can comprise an HBase at geographically remote data centers. As described in more detail below, once the job is stored in multiple data centers, the job manager 800 can then respond to the rule manager (e.g., acknowledge the reception of the jobs).

One embodiment of the jobs manager 800 includes the job scheduler 850. The job scheduler 850 can generate jobs based on the job requests and determine the appropriate queues 860 for the jobs and distributes the jobs to the appropriate queues. In one embodiment, the appropriate queues 860 are selected based on the type of job. That is, particular queues can be designed for and serviced by workers that are specifically configured to perform those jobs. By way of example and not limitation, the system can designate dedicated queues for the following jobs: preview jobs, video conversion jobs, text extraction jobs, virus scan jobs, thumbnail creation jobs, data loss prevention (DLP) jobs, etc. Alternatively or additionally, one or more general purpose queues could be utilized by one or more general purpose workers (i.e., workers configured to perform a variety of different types of jobs).

Figure 9:
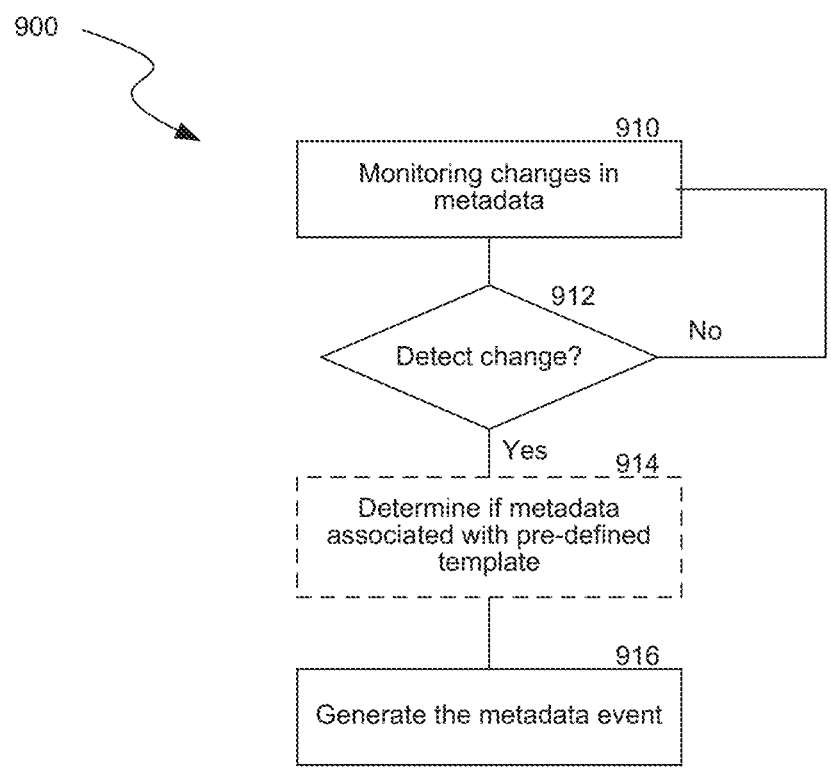
FIG. 9 depicts a data flow diagram illustrating generation of a metadata event, according to an embodiment.

FIG. 9 depicts a data flow diagram illustrating an example process 900 for generation of a metadata event, according to an embodiment. A metadata service engine such as, for example, the metadata data service engine 500 of FIG. 5 can, among other functions, perform the example process 900. The metadata service engine may be embodied as hardware and/or software, including combinations and/or variations thereof. In addition, in some embodiments, the metadata service engine can include instructions, wherein the instructions, when executed by one or more processors, cause the one or more processors to perform one or more processes including the following processes.

To begin, in process 910, the metadata service engine monitors changes in metadata. For example, the metadata service engine can monitor job requests, changed work items, events, actions, etc. in order to identify changes or potential changes to metadata within the collaborative cloud-based environment. In process 912, the metadata service engine determines if a change in the metadata is detected. The change in the metadata can be, for example a change in a metadata key-value pair.

If a change is detected in process 912, the metadata service engine optionally, in process 914, determines if the metadata is associated with a predetermined metadata template. For example, in some instances, the metadata service engine only monitors a subset of the metadata (e.g., metadata for which rules have been established and/or metadata associated with a defined metadata template). In process 916, the metadata service engine generates the metadata event. In some embodiments, the metadata event can be optionally generated based on whether the metadata or changed metadata is associated with a defined metadata template.

Figure 10:
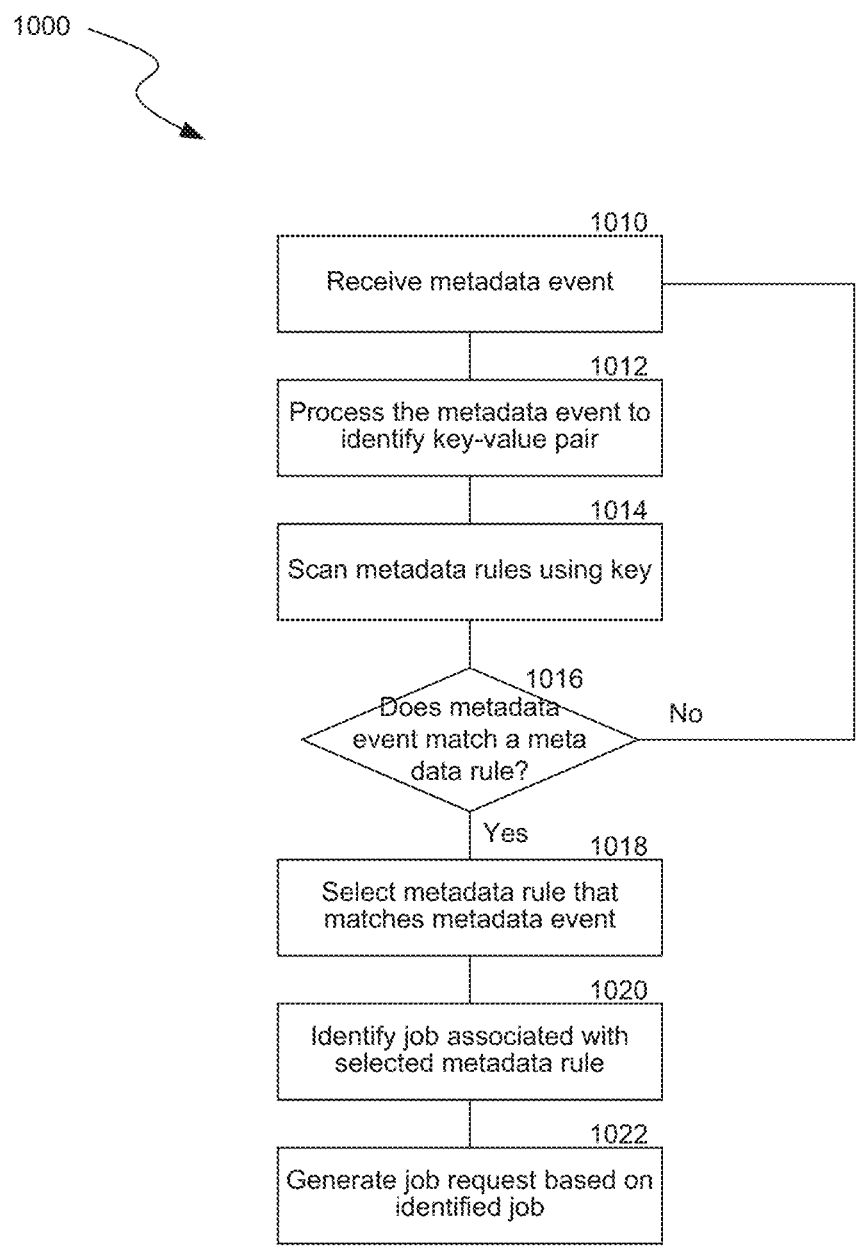
FIG. 10 depicts a data flow diagram illustrating an example process for automatically translating metadata events into one or more job requests based on user (or administrator) specified metadata rules, according to an embodiment.

FIG. 10 depicts a data flow diagram illustrating an example process 1000 for automatically translating metadata events into one or more job requests based on user (or administrator) specified metadata rules, according to an embodiment. A rule manager such as, for example, rule manager 700 of FIG. 7, can, among other functions, perform the example process 1000. The rule manager may be embodied as hardware and/or software, including combinations and/or variations thereof. In addition, in some embodiments, the rule manager can include instructions, wherein the instructions, when executed by one or more processors, cause the one or more processors to perform one or more processes including the following processes.

To begin, in process 1010, the rule manager receives a metadata event and, in process 1012, processes the metadata event to identify or capture an associated key-value pair. As discussed above, the metadata event can be an event that is initiated by a metadata service engine responsive to monitoring changes in metadata in content items in the collaborative cloud-based environment.

In process 1014, the rule manager scans the metadata rules based on the metadata key and, at decision process 1016, determines if the metadata key matches a metadata rule. In one embodiment, the rule manger can also scan the metadata rules for other conditions or values that are compared to the value of the key-value to make a determination about whether a metadata rule is triggered or if a metadata event matches a rule.

In process 1018, the rule manager selects a metadata rule that matches the metadata event, if one exists. Next, in process 1020, the rule manager identifies a job description associated with the selected metadata rule. For example, the job description can indicate the type of job that is to be performed when the rule is triggered. Lastly, in process 1022, the rule manager generates a new job request based on the job description. As discussed herein, the rule manager distributes the batched jobs to the jobs manager. In some embodiments, load balancers may be used to distribute events to multiple instances of the rule manager and jobs to multiple instances of the job manager, respectively. Additionally, the instances referred to herein are referring to additional distributed hardware resources.

Figure 11:
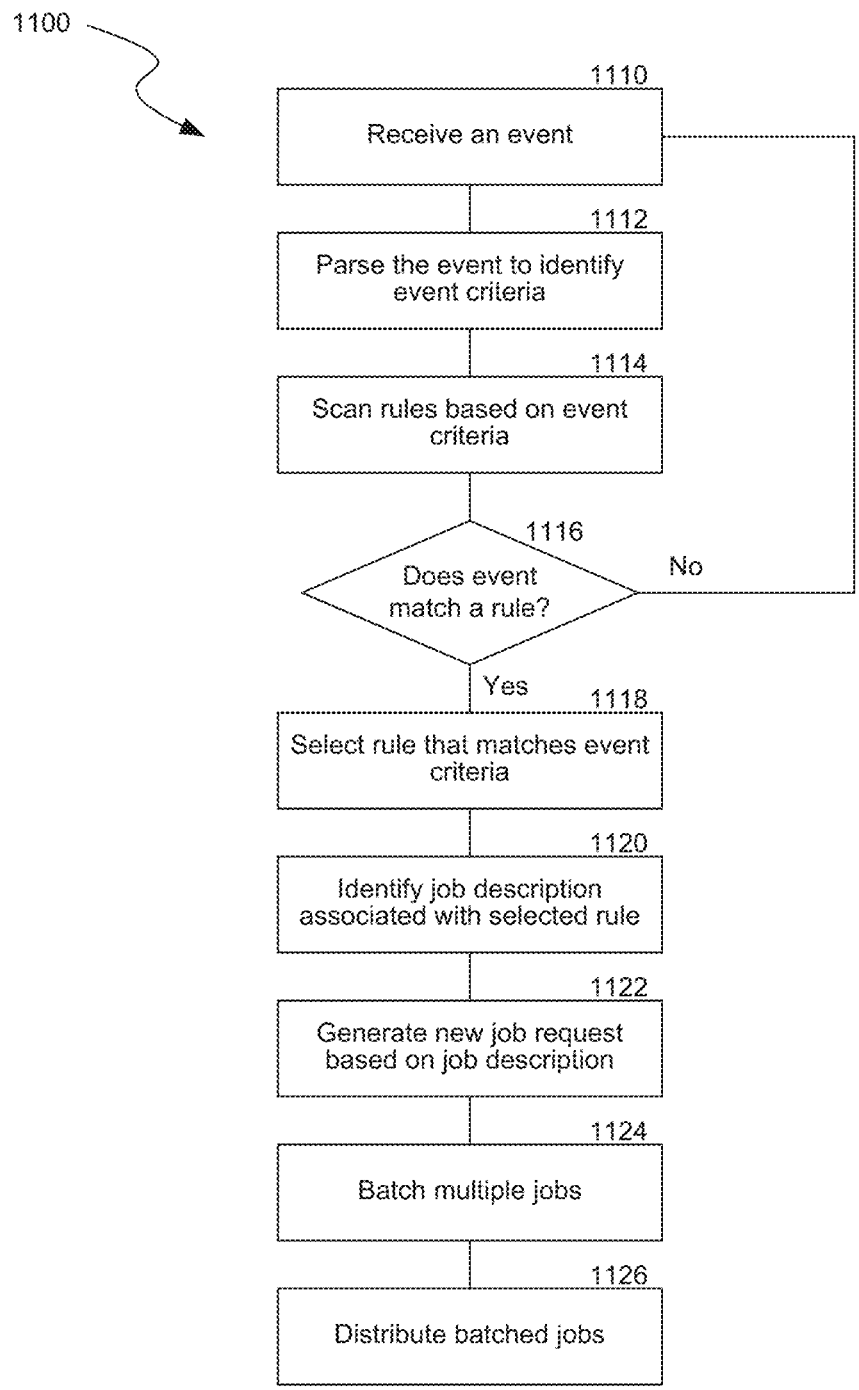
FIG. 11 depicts a data flow diagram illustrating an example process for automatically translating events into one or more job requests based on user (or administrator) specified rules, according to an embodiment.

FIG. 11 depicts a data flow diagram illustrating an example process 1100 for automatically translating events into one or more job requests in one or more back-end systems based on user (or administrator) specified rules, according to an embodiment. A rule manager such as, for example, rule manager 700 of FIG. 7, can, among other functions, perform the example process 1100. The rule manager may be embodied as hardware and/or software, including combinations and/or variations thereof. In addition, in some embodiments, the rule manager can include instructions, wherein the instructions, when executed by one or more processors, cause the one or more processors to perform one or more processes including the following processes.

To begin, in process 1110, the rule manager receives an event and, in process 1112, parses the event to identify event criteria. As discussed above, the event can be an ALF event that is initiated by a web application (e.g., front-end system) responsive to an action taken on a content item in the collaborative cloud-based environment.

In process 1112, the rule manager parses the event to identify event criteria. For example, the event criteria can include an action type (i.e., type of action performed that triggered the event, e.g., upload) or an enterprise identifier.

In process 1114, the rule manager scans the rules based on the event criteria and, at decision process 1116, determines if the event matches a rule. In one embodiment, the rule manger can also scan the rules for conditions that are compared to the event criteria to determine if an event matches a rule. In process 1118, the rule manager selects a rule that matches the event criteria, if one exists. Next, in process 1120, the rule manger identifies a job description associated with the selected rule. For example, the job description can indicate the type of job that is to be performed.

In process 1122, the rule manager generates a new job request based on the job description and, in process 1124, waits for additional new jobs to be generated to batch multiple job requests. Lastly, in process 1126, the rule manager distributes the batched jobs to the jobs manager. As discussed below with reference to FIG. 11, in some embodiments, load balancers may be used to distribute events to multiple instances of the rule manager and jobs to multiple instances of the job manager, respectively. Additionally, the instances referred to herein are referring to additional distributed hardware resources.

Figure 12:
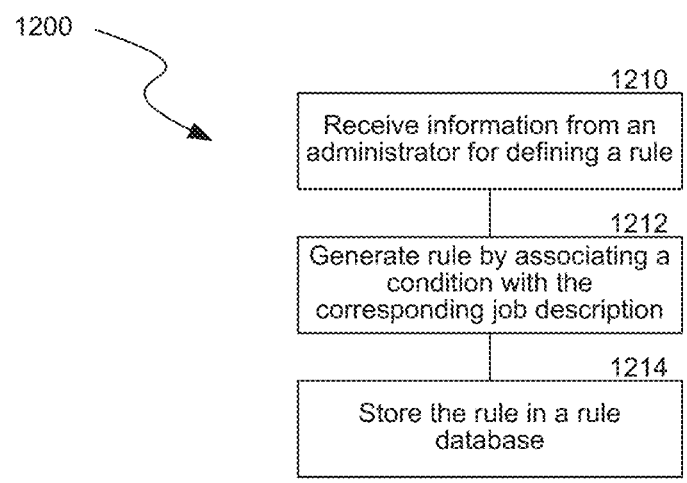
FIG. 12 depicts a flow diagram illustrating an example process for generating and storing a rule, according to an embodiment.

FIG. 12 depicts a flow diagram illustrating an example process 1200 for generating and storing a user-defined rule, according to an embodiment. A rule manager such as, for example, rule manager 700 of FIG. 7, can, among other functions, perform the example process 1200. The rule manager may be embodied as hardware and/or software, including combinations and/or variations thereof. In addition, in some embodiments, the rule manager can include instructions, wherein the instructions, when executed by one or more processors, cause the one or more processors to perform one or more processes including the following processes.

To begin, in process 1210, the rule manager receives information from an administer for defining a new rule. In one embodiment, the information includes a user defined condition and a corresponding job definition. For example, the condition "on file upload into folder A" can be received from the administrator with a corresponding job "move the file into folder B." As discussed above, the user-defined (or pre-defined) rules can be applied to incoming events (e.g., ALF events) to automatically generate jobs to be performed by workers in a computing platform.

In one embodiment, the rule manager can extract various additional conditions and/or job descriptions based on, for example, the type of condition. This is referred to herein as a complex rule. For example, if the condition "on file upload" is received with the job description "scan file," then the system can extract various jobs to perform in sequence: extract text, scan file for keyword, and quarantine file if keyword found.

In process 1212, the rule manager generates the rule by associating condition(s) with the corresponding job description(s) and, lastly, in process 1214, the rule is stored in a rule database.

Figure 13:
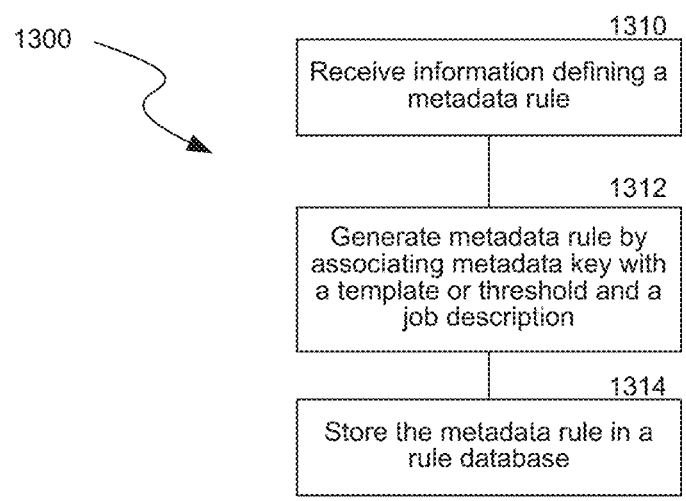
FIG. 13 depicts a flow diagram illustrating an example process for generating and storing a metadata rule, according to an embodiment.

FIG. 13 depicts a flow diagram illustrating an example process 1300 for generating and storing a metadata rule, according to an embodiment. A rule manager such as, for example, rule manager 700 of FIG. 7, can, among other functions, perform the example process 1300. The rule manager may be embodied as hardware and/or software, including combinations and/or variations thereof. In addition, in some embodiments, the rule manager can include instructions, wherein the instructions, when executed by one or more processors, cause the one or more processors to perform one or more processes including the following processes.

To begin, in process 1310, the rule manager receives information from an administrator for defining a new metadata rule. In one embodiment, the information identifies an associated template and/or a key value for metadata. Additionally, the information can also include a threshold value for the key that causes the rule to be triggered. For example, if the metadata template defines a contract, then one metadata attribute or key may be the value of the contract. A rule can be set that triggered a particular action or job in the event that the value of the contract exceeds a particular preset value. For instance, one or more notifications may be sent to particular individuals for review. Similarly, a metadata attribute of a contract template could include a status attribute that causes a particular action or job to be performed when the value of the key-value pair change from 'PENDING' to 'APPROVED'. In this manner, metadata or changes to metadata can trigger job requests (e.g., events or actions).

In process 1312, the rule manager generates the metadata rule by associating the metadata key with additional information (e.g., template and/or threshold value) and with one or more corresponding job description(s) and, lastly, in process 1314, the metadata rule is stored in a rule database.

Figure 14:
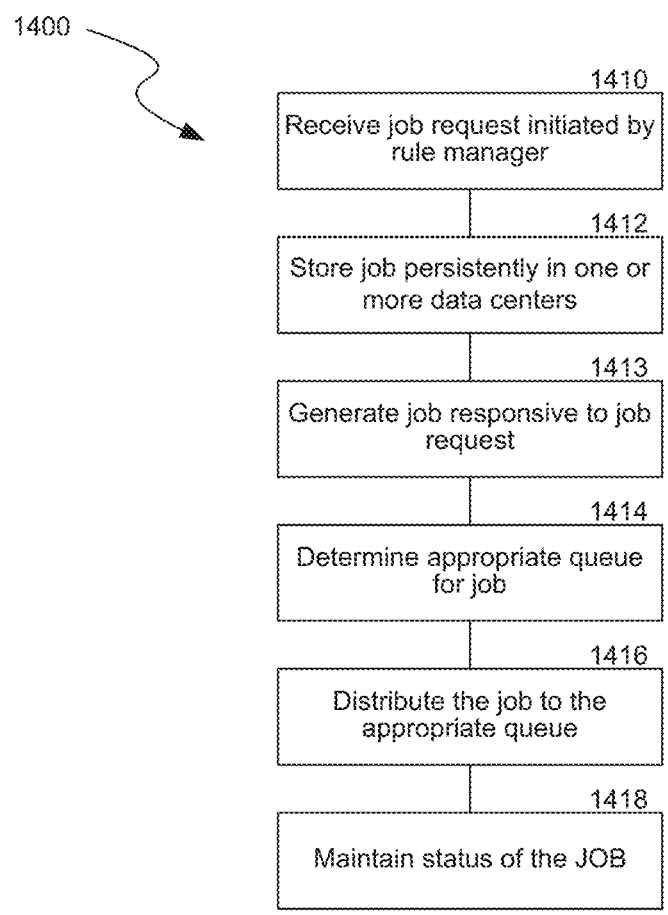
FIG. 14 depicts a flow diagram illustrating an example process for queuing jobs and ensuring job execution, according to an embodiment.

FIG. 14 depicts a flow diagram illustrating an example process 1400 for queuing jobs and ensuring job execution, according to an embodiment. A jobs manager such as, for example, jobs manager 800 of FIG. 8, can, among other functions, perform the example process 1400. The jobs manager may be embodied as hardware and/or software, including combinations and/or variations thereof. In addition, in some embodiments, the rule manager can include instructions, wherein the instructions, when executed by one or more processors, cause the one or more processors to perform one or more processes including the following processes.

To begin, in process 1410, the jobs manager receives a job initiated by the rule manager and, in process 1412, stores the job persistently in one or more data centers. In one embodiment, the jobs manager stores the job in multiple remote data centers at least one of which is geographically remote.

In process 1413, the jobs manager generates jobs responsive to the job requests and, in process 1414, the jobs manager determines an appropriate queue for the job. In one embodiment, the appropriate queues are selected based on the type of job. That is, particular queues can be designed for and serviced by workers that are specifically configured to perform those jobs. By way of example and not limitation, the system can designate dedicated queues for the following jobs: preview jobs, video conversion jobs, text extraction jobs, virus scan jobs, thumbnail creation jobs, data loss prevention (DLP) jobs, etc. Alternatively or additionally, one or more general purpose queues could be utilized by one or more general purpose workers (i.e., workers configured to perform a variety of different types of jobs).

In process 1416, the jobs manager distributes the job to the appropriate queue and, lastly, in process 1418, the jobs manager maintains the current status of the job. As described in more detail with reference to FIG. 15, status updates (e.g., started, completed, failed) can be persisted to the local HBase cluster.

Figure 15:
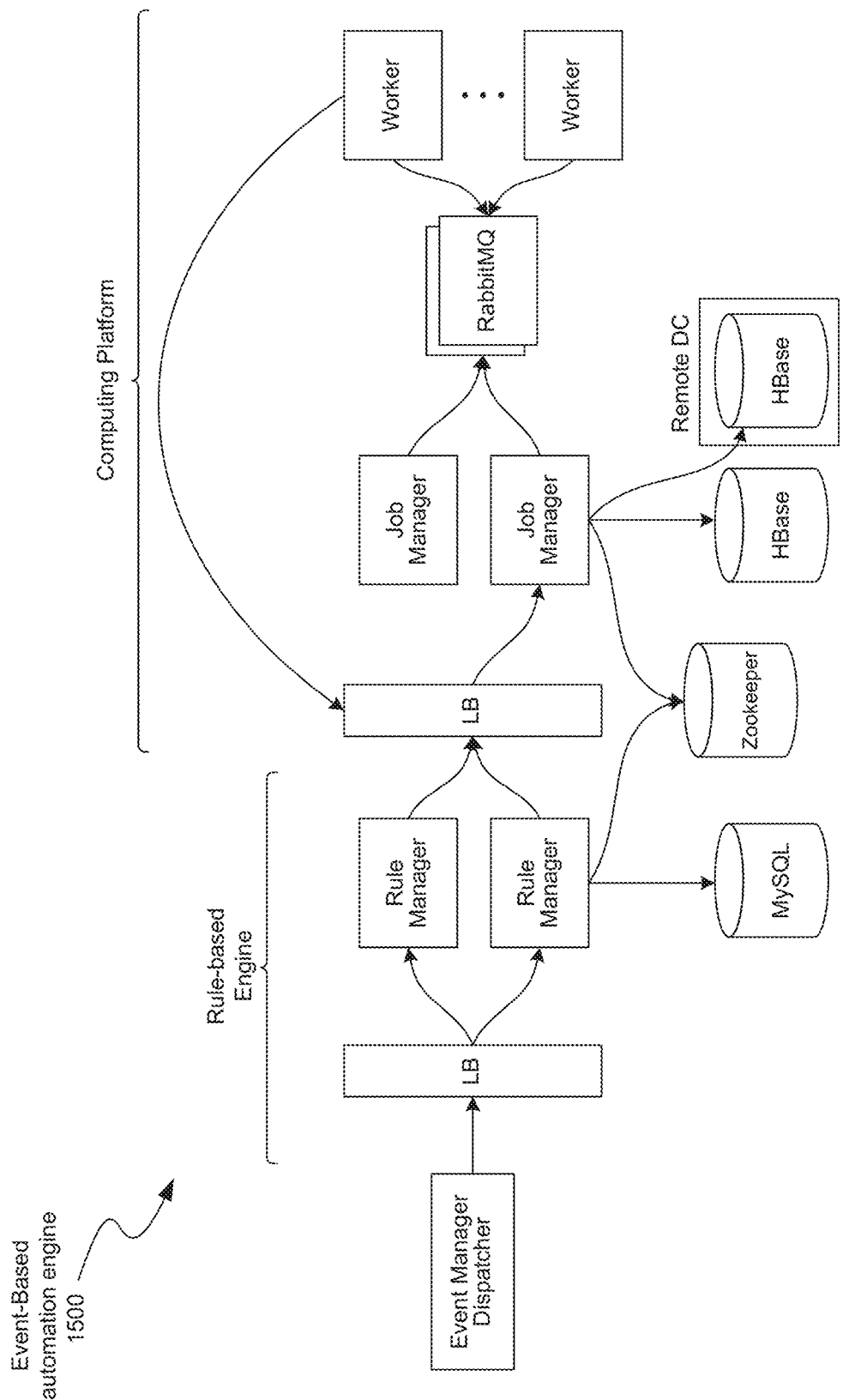
FIG. 15 depicts a diagram illustrating another example event-based automation engine including a rule-based engine and a computing platform.

FIG. 15 depicts a diagram illustrating another example event-based automation engine 1500 including a rule-based engine and a computing platform. As shown in the example of FIG. 15, the rule based engine includes an event manager dispatcher, an event load balancer, multiple rule managers, a job load balancer, multiple job managers, multiple rabbitMQ queues, and multiple workers. Additionally, a MySQL database is shown in communication with the multiple rule managers for storing the rules, a zookeeper distributed services system is shown in communication with the rule managers and the job managers as part of the distributed system to help coordinate various different services including coordination and distribution of new rules. Further, an HBase storage database is shown at a local data center and a second HBase storage database is replicated at a remote data center (i.e., remote from the first data center).

The rule manager is responsible for translating events it receives from the Action Log Dispatcher (ALD) (or Event Manager Dispatcher) into job requests depending on a set of customer specified rules. For example, if a file is uploaded to a certain folder, a task could be automatically created and assigned to a user for that file. More specifically, the rule manager generates jobs for content workflow based on the ALF stream. Importantly, incoming events are not acknowledged until jobs are persisted to Hbase and, thus, the rule matching and job generation step has low latency. In addition, the rules are user-defined and, thus, any number of rules can be defined. The rule manager can scale (i.e., with additional instances) with the increasing number of rules.

In one embodiment, events are distributed from an ALF system via the ALD service. The ALD can send a request containing a set of events to the rule manager. Each event can be described as an action log. Thus, for each action log, the rule manager can parse out the action_type and enterprise_id and then scan for rules matching the action_type and enterprise_id against its local cache.

In one embodiment, the rules are defined using a Rule Description Language (RDL) which can be parsed by the rule manager to extract the filters and job template. For example, rules can have an optional set of simple conditional filters such as, for example, "=" by which to filter out jobs to avoid the need to send no-op jobs to the job manager. The filters work by comparing data extracted from the action log against predefined static values. For job creation, rules can include a template job description that the rule manager can populate using data from the action log. The filled out template is essentially a serialized job body.

Once the events in the current request from the ALD are evaluated, the rule manager can forward the generated jobs to the job manager. The rule manager will receive an acknowledgement from the job manager and send an acknowledgement back to the ALD. If no jobs are created from a request from the ALD, then the rule manager will simply acknowledge the request immediately.

The job manager is a component of content workflow that receives job requests from the rule manager. In addition to supporting content workflow, the job manager is also intended to be a general-purpose job system that can provide asynchronous job execution for other services. The job manager is generally responsible for creating new jobs and monitoring the status of jobs. The job manager essentially ensures that a job will be executed. As discussed above, new jobs and status updates (e.g., started, completed, failed) can be persisted to the local HBase cluster.

In one embodiment, when the job manager receives a new job request, it first persistently stores the job to HBase. Once the job has been saved to HBase, the job manager will acknowledge the job request and thereby guarantee the execution of the job. After the job manager has acknowledged the job request, the job manager will then queue the job in RabbitMQ for execution. Workers actively pick up jobs off the queue and execute these jobs.

In one embodiment, prior to queuing the job, the job manager can inject callbacks into the job description to be notified by a worker before it begins executing a job, after it finishes executing a job, and/or if an error occurs during execution. To handle temporary errors, the job manager uses an actor to periodically re-queue jobs that have not been started or completed after a configurable amount of time. The job manager also has an actor that is dedicated to replicating to the remote HBase cluster on a configurable interval.

As illustrated in the example of FIG. 15, in one embodiment, the job managers receive requests from behind the job load balancer, which distributes requests between multiple job manager instances. In one embodiment, each instance runs a Jetty Web Server and Scalatra that are bundled in box-common. These services are used to handle communication to the job manager including receiving requests for new jobs and also for status updates from workers.

In one embodiment, each request to the rule manager can contain a batch of requests. The jobs (job requests) sent from the rule manager to the job manager can also be batched. In some embodiments, a single request from the rule manager will contain all the jobs that should be generated for a request from the action log dispatcher (ALD). A single event from the dispatcher and, thus, spawn a group of jobs (e.g., FILE UPLOAD) could trigger virus scanning and text extraction jobs. The job manager responds to a request by indicating, for each group of jobs, whether the entire group of jobs is guaranteed to be run. When an incoming job request is written to HBase, it is at that point "guaranteed" by the job manager. This guarantee will be reflected in the response. Additionally, the web interface scales horizontally by deploying additional servers with the job manager service.

In one embodiment, rule updates are performed through the rule manager web application. For example, the web application can perform CRUD operations on rules using the DB_Model framework. For the rule manager to keep its internal cache (or database) of rules in sync with the web application rule changes, the web application can insert an event into the ALF stream for every change to the rules. The rule manager processes all ALF events at least once, and thus, the rule manager identifies the rule update event and can responsively update the version in Zookeeper to notify all subscribing rule manager instances to update their local caches (rule databases).

In one embodiment, the rule manager utilizes RDL to describe rules. The RDL includes syntax for facilitating translation of an action to a job. In one embodiment, each rule has a rule description defined using RDL. The following snippet illustrates the basic structure of an RDL rule:

```
{
    "rdl_version": <int> // what version of the RDL are we using
    "rule_id": <int> // id of the rule. Useful for reporting/debugging
    "action_log_version": <int> // what version of the action was this written against
    "job": {
        /**
         * Template of the job body that would be forwarded to the job manager.
         * See jobs for more
         **/
    }
    "filter": {
        // filters we need to apply before job creation. see filters for more
    }
}
```

In one embodiment, rules are stored in a MySQL database. However, an additional index table can allow the rule manager to quickly filter rules by enterprise id and action type. An example Rules Search Index Table Schema and the associated Rules Table Schema follow.

Rules Search Index Table Schema:
rule_search_index_id—primary id
rule_id—foreign key to g_box_content_workflow_rules
action_type_id—id of the type of action that occurred
enterprise_id—id of the enterprise for which to apply this rule
(this field is set to 0 if there is no such specific enterprise)
all_enterprises—boolean of whether the rule applies to all enterprise users. If this is true, enterprise_id is set to 0.
all_users—boolean of whether the rule applies to all users. If this is true, enterprise_id is set to 0.
created—timestamp of when the rule_search_index was created
updated—timestamp of when the rule_search_index was updated
deleted—timestamp of when the rule_search_index was deleted
And an example Rules Table Schema:
rule_id—primary id
description—description of the rule specified in RDL
created—timestamp of when the rule was created
updated—timestamp of when the rule was updated
deleted—timestamp of when the rule was deleted To prevent conflicts of fields used to filter rules aside from action_type_id, only one field from the set of these "filter fields" (enterprise_id, allEnterprises, allUsers) is used. Examples of valid values for the "filter fields" include, but are not limited to:
Rule applies to all enterprise actions:
  enterprise_id=0;allEnterprises=true;allUsers=false
Rule applies to actions from enterprise 32:
  enterprise_id=32;allEnterprises=false;allUsers=false
Rule applies to all users (free+enterprise):
  enterprise_id=0;allEnterprises=false;allUsers=true In one embodiment, the rule manager also supports a ruleset. For example, rules that form part of a logical workflow can be grouped together into a ruleset. In this case, a ruleset_id is included with the Rules Template Table Schema. Users can interact with this feature from the UI.

In one embodiment, rules are cached in-memory of the rule manager instance. As discussed above, these local caches of all rule manager instances are synchronized via versioning in Zookeeper.

In one embodiment, the rule manager supports the following basic analysis of rules:
1. Given an event, find all rules that will be applied;
2. Given an event, list all jobs generated;
The service can also be set up with a secondary index that will allow aggregation counts of the kinds of rules or jobs present in the system.

In one embodiment, the rule manager supports templating. Templating includes the process of allowing the rule manager to populate fields from the action log into a given field or position in the job template. The fields can reference any field in the API event object.

In one embodiment, the rule manager supports versioning. Versioning allows the rule manager to check the action log version and the RDL version to determine if an incoming action log data can be successfully applied. For user-defined filters, only fields in the official Events API can be referenced. The rule manager is responsible for ensuring fields in the Events API are correctly extracted from action log data. This means that the rule manager is responsible for maintaining backwards compatibility.

In one embodiment, the rule manager supports permission control. That is, requests to the rule manager must be authenticated.

Figure 16:
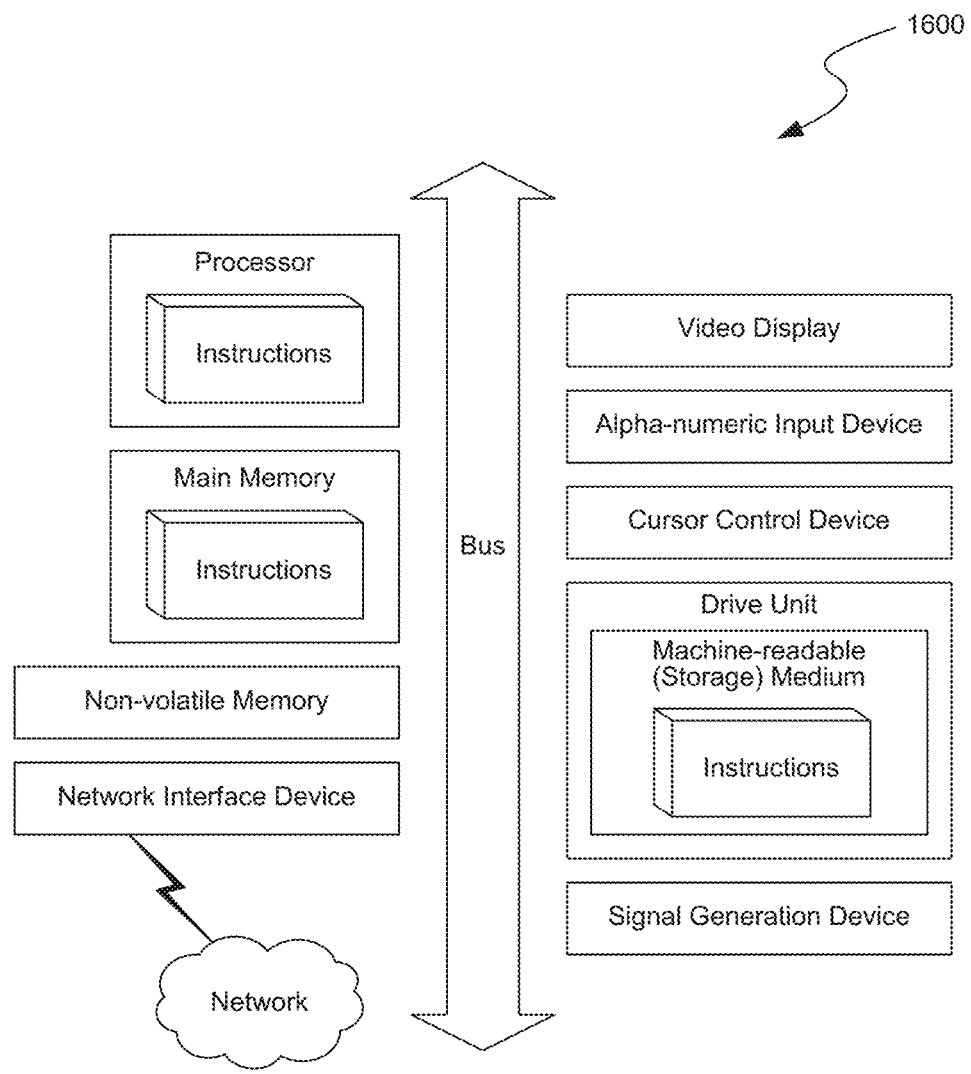
FIG. 16 depicts a diagrammatic representation of a machine in the example form of a computer system within which a set of instructions, for causing the machine to perform any one or more of the methodologies discussed herein, may be executed.

FIG. 16 illustrates a diagrammatic representation of a machine 1600 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, a switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disks, optical disks (e.g., Compact Disk Read-Only Memory (CD ROMS), Digital Versatile Disks, (DVDs), etc.), among others, and transmission type media such as digital and analog communication links.

The network interface device enables the machine 1600 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, a bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, handler, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. § 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The invention claimed is:

1. A computer-implemented method of facilitating metadata-based automations in a collaborative cloud-based environment, the method comprising: receiving, by a job manager system of the collaborative cloud-based environment, a job request from a rule manager system of the collaborative cloud-based environment, the job request based on a metadata event indicative of a change in a metadata key-value pair associated with a particular work item in the collaborative cloud-based environment, the change in the metadata key-value pair resulting from an action performed on the particular shared work item by a collaborator of the collaborative cloud-based environment: generating, by the job manager system, a job based on the received job request, the generated job including a set of parameters describing work to be executed in the collaborative cloud-based environment with respect to the particular work item; and distributing, by the job manager system, the generated job into a particular job queue to be processed by one or more worker machines in a distributed computing cluster associated with the collaborative cloud-based environment, the particular job queue one of a plurality of job queues.

2. The computer-implemented method of claim 1, further comprising: storing, by the job manager system, the received job request in persistent storage before generating the job.

3. The computer-implemented method of claim 2, wherein the persistent storage includes one or more geographically remote data centers.

4. The computer implemented method of claim 2, further comprising: acknowledging, by the job manager system, to the rule manager system, receipt of the job request in response to storing the job request in persistent storage.

5. The computer-implemented method of claim 2, further comprising: guaranteeing, by the job manager system, to the rule manager system, that the job will be processed in response to storing the job request in persistent storage.

6. The computer-implemented method of claim 1, further comprising: selecting, by the job manager system, the particular job queue based on a type of the generated job.

7. The computer-implemented method of claim 1, wherein the particular job queue is designated for jobs of a particular job type, and wherein the particular job queue is serviced by one or more worker machines configured to process the particular job type.

8. The computer-implemented method of claim 1, wherein the particular job queue is a general purpose job queue serviced by one or more general purpose worker machines, each of the one or more general purpose worker machines configured to process a plurality of different job types.

9. The computer-implemented method of claim 1, further comprising: monitoring, by the job manager system, performance of the generated job by the one or more worker machines processing the job.

10. The computer-implemented method of claim 1, further comprising: injecting, by the job manager system, callback information into the generated job prior to distributing the job into the particular job queue, the callback information configured to cause a worker machine to transmit notifications to the job manager system while processing the job.

11. The computer-implemented method of claim 1, wherein the job request is received from the rule manager system via a load balancer configured to distribute job requests based on loads at a plurality of instances of the job manager system.

12. The computer-implemented method of claim 1, further comprising: injecting, by the job manager system, a token into the job before distributing the job to the particular job queue; wherein the token is used by the one or more worker machines when processing the job and follows any additional job requests initiated by the one or more worker machines; wherein additional job requests received by the job manager system are not generated into jobs or distributed to job queues if the token has been received by the job manager more than a threshold number of times.

13. The computer implemented method of claim 1, wherein the generated job further includes action log data associated with the metadata event that triggered the job request.

14. A computer implemented method for facilitating metadata-based automations in a collaborative cloud-based environment, the method comprising: receiving, by an event-based automation system, a metadata event, wherein the metadata event identifies a change in a metadata key-value pair associated with a particular work item in the collaborative cloud-based environment, the change in the metadata key-value pair resulting from an action performed on the particular shared work item by a collaborator of the collaborative cloud-based environment: and automatically translating, by event-based automation system, the metadata event into a job request based on a pre-defined metadata rule that matches a key of the metadata key-value pair associated with the particular work item; generating, by the event-based automation system, a job based on the job request, the generated job including a set of parameters describing work to be executed in the collaborative cloud-based environment with respect to the particular work item; and distributing, by the event-based automation system, the generated job into a particular job queue to be processed by one or more worker machines in a distributed computing cluster associated with the collaborative cloud-based environment, the particular job queue one of a plurality of job queues.

15. The computer-implemented method of claim 14, wherein translating the received metadata event into a job request includes: processing the metadata event to capture the metadata key-value pair associated with the particular work item; accessing pre-defined metadata rules from a memory in communication with the event-based automation system; scanning the pre-defined metadata rules to select the pre-defined metadata rule that matches the key of the metadata key-value pair; and generating the job request associated with the first pre-defined metadata rule.

16. The computer-implemented method of claim 14, further comprising: monitoring, by the event-based automation system, changes in the metadata occurring with respect to work items within the collaborative cloud-based environment.

17. The computer-implemented method of claim 16, wherein the changes in metadata occur as a result of events or job requests that are performed in the collaborative cloud-based environment.

18. The computer-implemented method of claim 14, further comprising: processing, by the event-based automation system, a value of the metadata key-value pair associated with the particular work item; processing, by the event-based automation system, the pre-defined metadata rule that matches the key of the key-value pair to identify a threshold value associated with the key-value pair; and comparing by the event-based automation system, the value of the metadata key-value pair with the threshold value; wherein the job request is conditionally generated based on the comparison.

19. The computer-implemented method of claim 14, further comprising: storing, by the event-based automation system, the received job request in persistent storage before generating the job.

20. The computer-implemented method of claim 14, further comprising: selecting, by the event-based automation system, the particular job queue based on a type of the generated job.

21. The computer implemented method of claim 14, wherein the particular job queue is designated for jobs of a particular job type, and wherein the particular job queue is serviced by one or more worker machines configured to process the particular job type.

22. The computer implemented method of claim 14, wherein the particular job queue is a general purpose job queue serviced by one or more general purpose worker machines, each of the one or more general purpose worker machines configured to process a plurality of different job types.

23. The computer implemented method of claim 14, further comprising: monitoring, by the event-based automation system, performance of the generated job by the one or more worker machines processing the job.

24. The computer implemented method of claim 14, further comprising: injecting, by the event-based automation system, callback information into the generated job prior to distributing the job into the particular job queue, the callback information configured to cause a worker to transmit notifications to the job manager while processing the job.

25. An event-based automation system for facilitating metadata-based automations in a collaborative cloud-based environment, comprising a non-transitory machine readable storage medium having instructions embodied thereon, the instructions when executed cause a processor to perform processing, the event-based automation system comprising: an event dispatcher configured to: monitor for changes in metadata occurring with respect to work items within the collaborative cloud-based environment; and generate an event in response to detecting a change in a metadata key-value pair associated with a particular work item in the collaborative cloud-based environment, the change in the metadata key-value pair resulting from an action performed on the particular shared work item by a collaborator of the collaborative cloud-based environment: a rule manager system communicatively coupled to the event dispatcher, the rule manager system configured to: automatically translate the metadata event generated by the event dispatcher into a job request based on a pre-defined metadata rule that matches a key of the metadata key-value pair associated with particular work item; a job manager system communicatively coupled to the rule manager system, the job manager system configured to: generate a job based on the job request from the rule manager system, the generated job including a set of parameters describing work to be executed in the collaborative cloud-based environment with respect to the particular work item; and distribute the generated job into a particular job queue for processing, the particular job queue one of a plurality of job queues; and one or more worker machines in a distributed computing cluster, the one or more worker machines configured to: receive the job generated by the job manager out of the particular job queue; and process the job.

* * * * *